United States Patent
Kim et al.

(10) Patent No.: US 11,720,324 B2
(45) Date of Patent: Aug. 8, 2023

(54) METHOD FOR DISPLAYING ELECTRONIC DOCUMENT FOR PROCESSING VOICE COMMAND, AND ELECTRONIC DEVICE THEREFOR

(71) Applicant: Samsung Electronics Co., Ltd., Suwon-si (KR)

(72) Inventors: Kyungtae Kim, Suwon-si (KR); Seonho Lee, Suwon-si (KR); Yoonjeong Choi, Suwon-si (KR); Hosung You, Suwon-si (KR); Bunam Jeon, Suwon-si (KR); Taeho Ha, Suwon-si (KR); Changho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 16/960,013

(22) PCT Filed: Jan. 2, 2019

(86) PCT No.: PCT/KR2019/000039
§ 371 (c)(1),
(2) Date: Jul. 2, 2020

(87) PCT Pub. No.: WO2019/135599
PCT Pub. Date: Jul. 11, 2019

(65) Prior Publication Data
US 2021/0089269 A1    Mar. 25, 2021

(30) Foreign Application Priority Data

Jan. 5, 2018    (KR) .................. 10-2018-0001862

(51) Int. Cl.
*G06F 3/16*    (2006.01)
*G06V 30/412*    (2022.01)
*G06Q 10/02*    (2012.01)

(52) U.S. Cl.
CPC ............ *G06F 3/167* (2013.01); *G06V 30/412* (2022.01); *G06Q 10/02* (2013.01)

(58) Field of Classification Search
CPC ..... G06F 3/167; G10L 15/22; G10L 15/1822; G10L 15/26
See application file for complete search history.

(56) References Cited

U.S. PATENT DOCUMENTS 8,718,242 B2    5/2014  Bangalore et al.
9,836,192 B2 *  12/2017  Katsuranis ............ G06F 3/0484
(Continued)

FOREIGN PATENT DOCUMENTS

JP    4006338 B2    11/2007
JP    2010217628 A   9/2010
(Continued)

OTHER PUBLICATIONS

FreedomSpeech (Youtube: https://www.youtube.com/watch?v= DEISEronSIQ, 58 seconds duration, pp. 1-3, published 2014). (Year: 2014).*

(Continued)

*Primary Examiner* — Tan H Tran

(57) ABSTRACT

Various embodiments of the present invention relate to an apparatus and a method for displaying an electronic document for processing a user's voice command in an electronic device. The electronic device includes an input device; a display; and a processor, wherein the processor may be configured to detect a voice command of a user using the input device, if outputting an electronic document corresponding to the voice command, identify at least one input (Continued)

field in the electronic document, determine guide information based on information of the at least one input field, and display the electronic document comprising the guide information using the display. Other embodiments may be possible.

14 Claims, 24 Drawing Sheets

(56) References Cited

U.S. PATENT DOCUMENTS

| | | | |
|---|---|---|---|
| 2004/0044523 | A1 | 3/2004 | Sakai et al. |
| 2005/0071172 | A1* | 3/2005 | James ................ G06F 3/167 704/E15.044 |
| 2007/0213984 | A1 | 9/2007 | Ativanichayaphong et al. |
| 2009/0171669 | A1* | 7/2009 | Engelsma ............. G10L 15/22 704/E15.001 |
| 2009/0306980 | A1 | 12/2009 | Shin |
| 2011/0085191 | A1* | 4/2011 | Takato ............... H04N 1/00435 358/1.13 |
| 2012/0313849 | A1* | 12/2012 | Bak ..................... G06F 3/167 345/156 |
| 2013/0033643 | A1* | 2/2013 | Kim ................. H04N 21/44218 348/563 |
| 2014/0191949 | A1 | 7/2014 | Park et al. |
| 2014/0195243 | A1* | 7/2014 | Cha ..................... H04N 21/654 704/270.1 |
| 2014/0196087 | A1 | 7/2014 | Park et al. |
| 2014/0343950 | A1* | 11/2014 | Simpson ................ G10L 15/22 704/275 |
| 2017/0351486 | A1* | 12/2017 | Won ..................... G06F 3/013 |
| 2018/0121881 | A1* | 5/2018 | Kumar ................ G06F 3/04842 |
| 2018/0181545 | A1* | 6/2018 | Qu ........................ G06F 40/174 |
| 2018/0329677 | A1* | 11/2018 | Gruber ................. G06F 3/0488 |
| 2018/0336010 | A1* | 11/2018 | Mukherjee .......... G06F 9/45512 |

FOREIGN PATENT DOCUMENTS

| | | |
|---|---|---|
| KR | 10-2006-0020101 A | 3/2006 |
| KR | 10-2009-0115599 A | 11/2009 |
| KR | 10-2010-0011786 A | 2/2010 |
| KR | 10-0988397 B1 | 10/2010 |
| KR | 10-1066732 B1 | 9/2011 |
| KR | 10-2012-0040936 A | 4/2012 |
| KR | 10-1207435 B1 | 12/2012 |
| KR | 10-2013-0016024 A | 2/2013 |
| KR | 10-2014-0089847 A | 7/2014 |
| KR | 10-2015-0072625 A | 6/2015 |
| KR | 10-2016-0039830 A | 4/2016 |

OTHER PUBLICATIONS

International Search Report dated Apr. 8, 2019 in connection with International Patent Application No. PCT/KR2019/000039, 2 pages.
Written Opinion of the International Searching Authority dated Apr. 8, 2019 in connection with International Patent Application No. PCT/KR2019/000039, 5 pages.
Korean Intellectual Property Office, "Office Action," dated Jul. 11, 2022, in connection with Korean Patent Application No. 10-2018-0001862, 10 pages.
Korean Intellectual Property Office, "Notice of Patent Grant," dated Jan. 5, 2023, in connection with Korean Patent Application No. 10-2018-0001862, 5 pages.

* cited by examiner

METHOD FOR DISPLAYING ELECTRONIC DOCUMENT FOR PROCESSING VOICE COMMAND, AND ELECTRONIC DEVICE THEREFOR

CROSS-REFERENCE TO RELATED APPLICATIONS

This application is a 371 of International Application No. PCT/KR2019/000039 filed on Jan. 2, 2019, which claims priority to Korean Patent Application No. 10-2018-0001862 filed on Jan. 5, 2018, the disclosures of which are herein incorporated by reference in their entirety.

BACKGROUND

1. Field

Various embodiments of the present invention relate to an apparatus and a method for displaying an electronic document for processing a user's voice command in an electronic device.

2. Description of Related Art

With development of information communication technology and semiconductor technology, an electronic device may provide various functions such as a broadcast function, a wireless Internet function, a camera function, a user authentication function, or an electronic payment function. The electronic device may receive a user's voice command through an input device (e.g., a microphone) and provide a function corresponding to the user's voice command so that the user may use various functions more easily.

An electronic device may display an electronic document (e.g., a web page) including a select field (e.g., a login select field) for executing a function connected to an input field (e.g., an ID, a password input field) where a user may input data. In addition, the electronic device may analyze a use's voice command and thus display data in the input field of the electronic document or execute the function corresponding to the select field. However, since the electronic document displays a plurality of contents together besides information (e.g., a text, an image) related to the input field or the select field, the user may have difficulty in accurately identifying the voice command indicating the input field or the select field. In addition, as the user does not accurately obtain the voice command corresponding to the function provided by the electronic document, the electronic device may receive the user's voice command which is input ambiguously, and may not accurately obtain a user's intent which matches a voice command received using information displayed on the electronic document.

Various embodiments of the present invention may provide an apparatus and a method for displaying an electronic document including guide information for processing a user's voice command in an electronic device.

SUMMARY

According to various embodiments of the invention, an electronic device includes an input device; a display; and a processor, wherein the processor may be configured to detect a voice command of a user using the input device, if outputting an electronic document corresponding to the voice command, identify at least one input field in the electronic document, determine guide information based on information of the at least one input field, and display the electronic document including the guide information using the display.

According to various embodiments of the invention, an operating method of an electronic device may include detecting a voice command of a use, if outputting an electronic document corresponding to the voice command, identifying at least one input field in the electronic document, determining guide information based on information of the at least one input field, and displaying the electronic document including the guide information.

An electronic device according to various embodiments may enable a user to easily input a voice command by displaying an electronic document including guide information, and accurately obtain a user's intent corresponding to the voice command.

DETAILED DESCRIPTION

Hereinafter, various embodiments of the present invention will be described in detail with reference to the accompanying drawings. In describing the embodiment of the present invention, if it is determined that a detailed description of a related known function or configuration may unnecessarily obscure the subject matter of the present invention, the detailed description will be omitted. Terms to be described are terms defined in consideration of the functions of the present invention, which may vary according to a user's or operator's intent or practice. Hence, their definition should be made based on contents throughout this specification.

Figure 1:
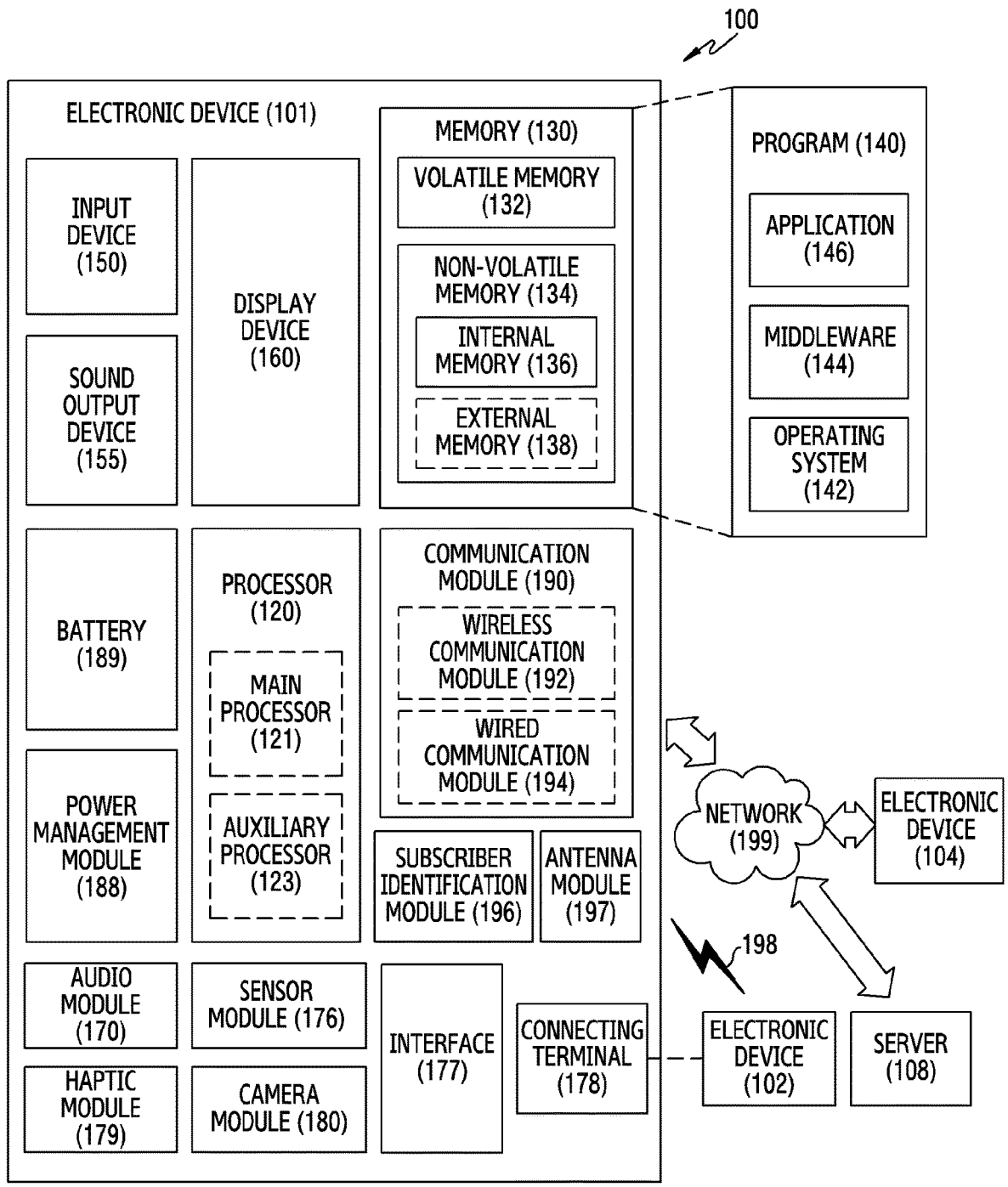
FIG. 1 is a block diagram of an electronic device for displaying an electronic document including guide information corresponding to a user's voice command in a network environment, according to various embodiments.

FIG. 1 is a block diagram of an electronic device for executing a function corresponding to pattern data generated using a microphone of a network environment, according to various embodiments.

FIG. 1 is a block diagram of an electronic device 101 for executing a function corresponding to pattern data generated using a microphone of a network environment 100, according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device

101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Before describing an embodiment of the present invention, an integrated intelligence system to which an embodiment of the present invention may be applied will be described.

Figure 2:
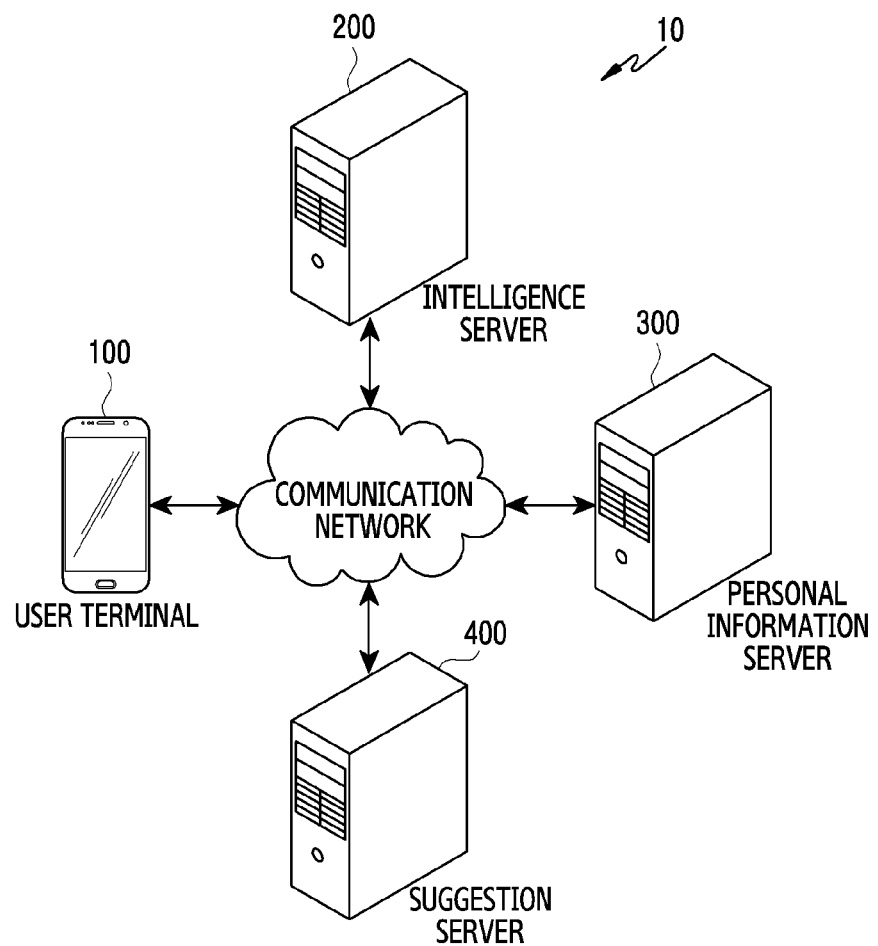
FIG. 2 is a diagram illustrating an integrated intelligence system according to various embodiments of the present invention.

FIG. 2 is a diagram illustrating an integrated intelligence system according to various embodiments of the present invention. A user terminal 100 of FIG. 2 may be identical or similar at least in part to the electronic device 101 of FIG. 1.

Referring to FIG. 2, the integrated intelligence system 10 may include the user terminal 100, an intelligence server 200, a personal information server 300, or a suggestion server 400.

The user terminal 100 may provide a user with a required service through an app (or an application program) (e.g., an alarm app, a message app, or a picture (gallery) app) stored in the user terminal 100. For example, the user terminal 100 may execute and operate a different app through an intelligence app (or, a voice recognition app) stored in the user terminal 100. The user terminal 100 may receive a user input for executing and operating the different app through the intelligence app of the user terminal 100. The user input may be received through, for example, a physical button, a touch pad, a voice input, or a remote input. According to an embodiment, the user terminal 100 may a device of various types. The electronic device may include, for example, at least one of a portable communication device (e.g., a smart phone), a computer device, a portable multimedia device, a portable medical device, a camera, a wearable device, or a home appliance. The user terminal 100 according to the embodiment of the present disclosure is not limited to the aforementioned devices.

According to an embodiment, the user terminal 100 may receive a user's speech as a user input. The user terminal 100 may receive the user's speech and generate a command to operate the app based on the user's speech. Hence, the user terminal 100 may operate the app using the command.

According to an embodiment, the intelligence server 200 may receive a user voice input from the user terminal 100 through a communication network (e.g., the network 199 of FIG. 1) and change it to text data. In another embodiment, the intelligence server 200 may generate (or select) a path rule based on the text data. The path rule may include information relating to an action (or an operation) for performing an app function or information relating to a parameter required to execute the action. As another example, the path rule may include an order of the operation of the app. The user terminal 100 may receive the path rule, select an app according to the path rule, and execute an action included in the path rule in the selected app.

The term "path rule" of the present disclosure may generally indicate, but is not limited to, a sequence of states for an electronic device to perform a task requested by the user. For example, the path rule may include information relating to the sequence of the states. The task may be, for example, any action which the intelligence app may provide. The task may include creating a schedule, sending a picture to a desired counterpart, or providing weather information. The user terminal 100 may perform the task, by sequentially having at least one or more states (e.g., action states of the user terminal 100).

According to an embodiment, the path rule may be provided or generated by an artificial intelligent (AI) system. The AI system may be a rule-based system, a neural network-based system (e.g., a feedforward neural network (FNN)), or a recurrent neural networks (RNN). As another example, the AI system may be a combination thereof or other AI system. According to an embodiment, the path rule may be selected from a set of defined path rules, or may be generated in real time in response to a user request. For example, the AI system may select at least one path rule among a plurality of defined path rules, or generate a path rule dynamically (or in real time). As another example, the user terminal 100 may use a hybrid system to provide the path rule.

According to an embodiment, the user terminal 100 may execute the action, and display a screen corresponding to the state of the user terminal 100 which executes the action on a display. For another example, the user terminal 100 may execute the action, and may not display a result of performing the action on the display. The user terminal 100 may, for example, execute a plurality of actions, and display only some results of the plurality of the actions on the display. The user terminal 100 may, for example, display only a result of executing the last action on the display. As another example, the user terminal 100 may receive a user's input and display a result of executing the action on the display.

According to an embodiment, the personal information server 300 may include a database which stores user information. For example, the personal information server 300 may receive user information (e.g., context information, or application execution) from the user terminal 100 and store it in the database. The intelligence server 200 may receive the user information from the personal information server 300 through a communication network and use it to generate a path rule for the user input. According to an embodiment, the user terminal 100 may receive user information from the personal information server 300 over the communication network and use it as information for managing the database.

According to an embodiment, the suggestion server 400 may include a database which stores information relating to a function in a terminal or introduction of an application or a function to be provided. For example, the suggestion server 400 may receive user information of the user terminal 100 from the personal information server 300 and include a database of functions which the user may use. The user terminal 100 may receive information of the function to be provided from the suggestion server 400 over the communication network and provide the information to the user.

Figure 3:
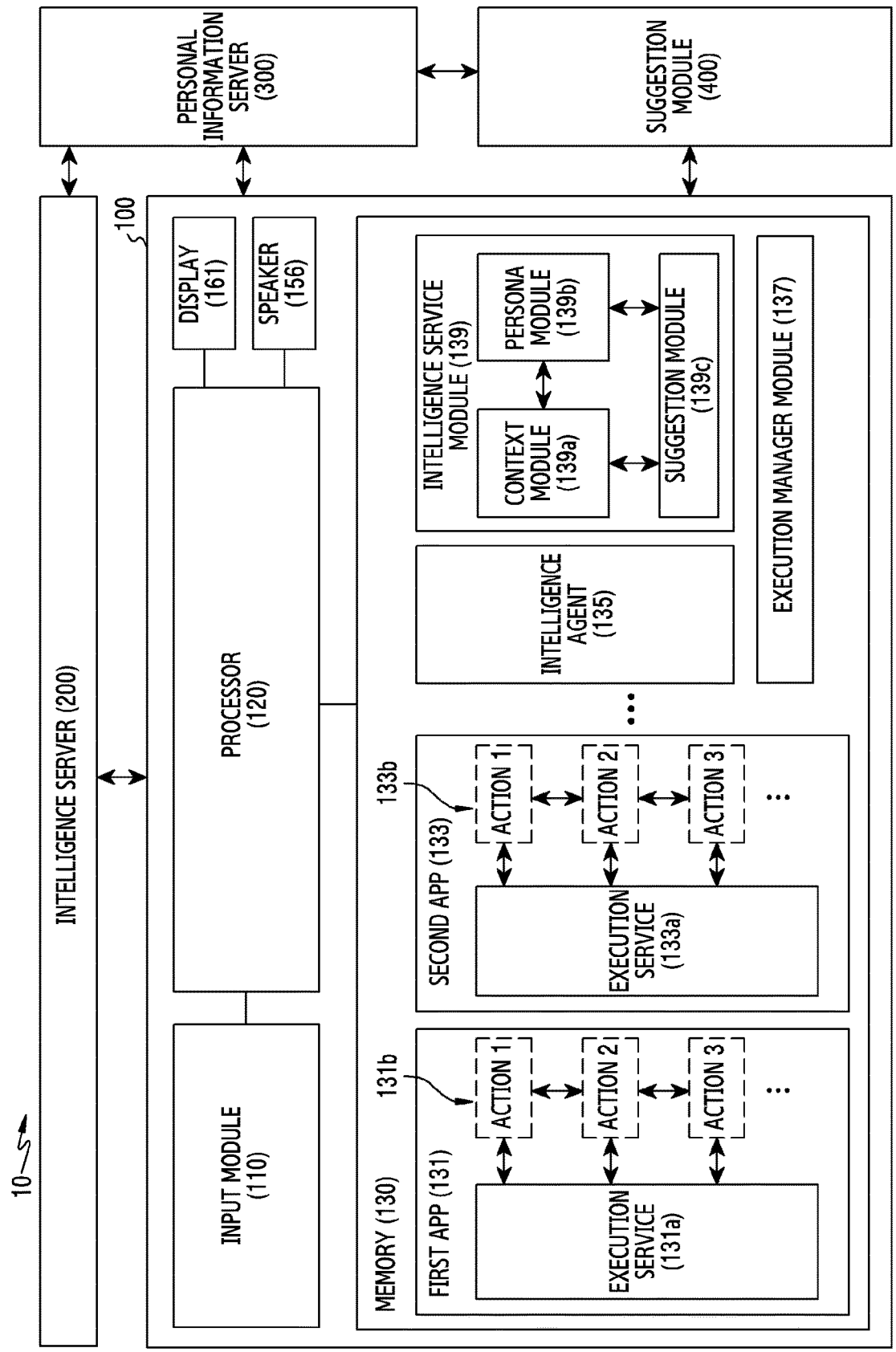
FIG. 3 is a block diagram illustrating a user terminal of an integrated intelligence system according to an embodiment of the present invention.

FIG. 3 is a block diagram illustrating a user terminal of an integrated intelligence system according to an embodiment of the present invention.

Referring to FIG. 3, the user terminal 100 may include an input module 110, a display 161, a speaker 156, a memory 130 or a processor 120. The user terminal 100 may further include a housing, and components of the user terminal 100 may be received inside the housing or may be positioned on the housing. The user terminal 100 may further include a communication circuit positioned inside the housing. The user terminal 100 may transmit and receive data (or, information) to and from an external server (e.g., the intelligence server 200) through the communication circuit.

According to an embodiment, the input module 110 may receive a user input from the user. For example, the input module 110 may receive the user input from a connected external device (e.g., a keyboard or a headset). As another example, the input module 110 may include a touch screen (e.g., a touch screen display) coupled with the display 161. As another example, the input module 110 may include a hardware key (or, a physical key) positioned in the user terminal 100 (or, the housing of the user terminal 100).

According to an embodiment, the input module 110 may include a microphone for receiving a user's speech as a voice signal. For example, the input module 110 includes a speech input system, and may receive a user's speech as a voice signal through the speech input system. The microphone may be exposed through, for example, a part (e.g., a first part) of the housing.

According to an embodiment, the display 161 may display an execution screen of an image or a video, and/or an application. For example, the display 161 may display a graphic user interface (GUI) of an app. According to an embodiment, the display 161 may be exposed through a part (e.g., a second part) of the housing.

According to an embodiment, the speaker 156 may output a voice signal. For example, the speaker 156 may output the voice signal generated in the user terminal 100 to outside. According to an embodiment, the speaker 156 may be exposed through a part (e.g., a third part) of the housing.

According to an embodiment, the memory 130 may store a plurality of apps (or, application programs) 131 and 133. The plurality of the apps 131 and 133 may be, for example, programs for performing a function corresponding to a user's input. According to an embodiment, the memory 130 may store an intelligence agent 135, an execution manager module 137 or an intelligence service module 139. The intelligence agent 135, the execution manager module 137, or the intelligence service module 139 may be, for example, a framework (or an application framework) for processing the received user input (e.g., the user speech).

According to an embodiment, the memory 130 may include a database for storing information required to recognize a user input. For example, the memory 130 may include a log database capable for storing log information. As another example, the memory 130 may include a persona database for storing user information.

According to an embodiment, the memory 130 may store the plurality of the apps 131 and 133, and the plurality of the apps 131 and 133 may be loaded and executed in the memory 130. For example, the plurality of the apps 131 and 133 stored in the memory 130 may be loaded and driven by the execution manager module 137. The plurality of the apps 131 and 133 may include execution service modules 131*a* and 133*a* for performing functions. In an embodiment, the plurality of the apps 131 and 133 may execute a plurality of actions (e.g., a sequence of states) 131*b* and 133*b* through the execution service modules 131*a* and 133*a* to perform functions. In other words, the execution service modules 131*a* and 133*a* may be enabled by the execution manager module 137, and may execute the plurality of the actions 131*b* and 133*b*.

According to an embodiment, if the actions 131*b* and 133*b* of the plurality of the apps 131 and 133 are executed, an execution state screen according to the execution of the actions 131*b* and 133*b* may be displayed on the display 161. The execution state screen may be, for example, a screen in which the actions 131*b* and 133*b* are completed. The execution state screen may be, as another example, a screen in which the execution of the actions 131*b* and 133*b* is partial landing (e.g., if parameters necessary for the actions 131*b* and 133*b* are not input).

According to an embodiment, the execution service modules 131*a* and 133*a* may execute the actions 131*b* and 133*b* according to a path rule. For example, the execution service modules 131*a* and 133*a* may be enabled by the execution manager module 137, receive an execution request according to the path rule from the execution manager module 137, and execute functions of the plurality of the apps 131 and 133, by conducting the actions 131*b* and 133*b* in response to the execution requests. If the executions of the actions 131*b* and 133*b* are completed, the execution service modules 131*a* and 133*a* may transfer completion information to the execution manager module 137.

According to an embodiment, if the plurality of the actions 131*b* and 133*b* is executed in the plurality of the apps 131 and 133, the plurality of the actions 131*b* and 133*b* may be executed in sequence. If the execution of one action (e.g., action 1 of the first app 131, or action 1 of the second app 133) is completed, the execution service modules 131*a* and 133*a* may open a next action (e.g., action 2 of the first app 131, or action 2 of the second app 133), and transmit completion information to the execution manager module 137. Herein, opening an arbitrary action may be understood as switching the arbitrary action to an executable state, or preparing the execution of the arbitrary operation. In other words, if the arbitrary action is not opened, the corresponding action may be not executed. If the completion information is received, the execution manager module 137 may transmit an execution request for a next action (e.g., action 2 of the first app 131, action 2 of the second app 133) to the execution service module. According to an embodiment, if the plurality of the apps 131 and 133 is executed, the plurality of the apps 131 and 133 may be sequentially executed. For example, if the execution of the last action (e.g., action 3 of the first app 131) of the first app 131 is completed and the completion information is received, the execution manager module 153 may transmit the execution request of the first action (e.g., action 1 of the second app 133) of the second app 133 to the execution service 133*a*.

According to an embodiment, if the plurality of the actions 131*b* and 133*b* is executed in the plurality of the apps 131 and 133, result screens according to the execution of the plurality of the executed actions 131*b* and 133*b* respectively may be displayed on the display 161. According to an embodiment, only some of the plurality of the result screens according to the execution of the plurality of the executed actions 131*b* and 133*b* may be displayed on the display 161.

According to an embodiment, the memory 130 may store an intelligence app (e.g., a voice recognition app) interworking with the intelligence agent 135. The app interworking with the intelligence agent 135 may receive and process a user's speech as a voice signal. According to an embodiment, the app interworking with the intelligence agent 135 may be operated by a particular input (e.g., an input through a hardware key, an input through a touch screen, a particular voice input) inputted through the input module 110.

According to an embodiment, the intelligence agent 135, the execution manager module 137, or the intelligence service module 139 stored in the memory 130 may be executed by the processor 120. The function of the intelligence agent 135, the execution manager module 137, or the intelligence service module 139 may be implemented by the processor 120. According to an embodiment, the function of the intelligence agent 135, the execution manager module 137, or the intelligence service module 139 may be carried out by the processor 120. According to an embodiment, the intelligence agent 135, the execution manager module 137, or the intelligence service module 139 stored in the memory 130 may be implemented by hardware as well as software.

According to an embodiment, the processor 120 may control an overall operation of the user terminal 100. For example, the processor 120 may receive a user input by controlling the input module 110. The processor 120 may display an image by controlling the display 161. The processor 120 may output a voice signal by controlling the speaker 156. The processor 120 may execute a program by controlling the memory 130, or fetch or store necessary information.

According to an embodiment, the processor 120 may execute the intelligence agent 135, the execution manager module 137, or the intelligence service module 139 stored in the memory 130. Accordingly, the processor 120 may implement the function of the intelligence agent 135, the execution manager module 137, or the intelligence service module 139.

According to an embodiment, the processor 120 may generate a command for operating an app based on a voice signal received as a user input by executing the intelligence agent 135. According to an embodiment, the processor 120 may execute the plurality of the apps 131 and 133 stored in the memory 130 according to the generated command by executing the execution manager module 137. According to an embodiment, the processor 120 may manage user's information by executing the intelligence service module 139, and process a user input using the user's information.

The processor 120 may transmit the user input received through the input module 110 to the intelligence server 200 by executing the intelligence agent 135, and process the user input through the intelligence server 200.

According to an embodiment, the processor 120 may preprocess the user input before transmitting the user input to the intelligence server 200 by executing the intelligence agent 135. According to an embodiment, to preprocess the user input, the intelligence agent 135 may include an adaptive echo canceller (AEC) module, a noise suppression (NS) module, an end-point detection (EPD) module, or an automatic gain control (AGC) module. The AEC module may cancel echo included in the user input. The NS module may suppress background noise included in the user input. The EPD module may detect an end-point of a user voice included in the user input, and find a portion where the user's voice is present using the detected end-point. The AGC module may recognize the user input, and adjust a volume of the user input to be suitable to process the recognized user input. According to an embodiment, the processor 120 may execute all the preprocessing configuration for performance, but the processor 120 in another embodiment may execute part of the preprocessing configuration to operate with low power.

According to an embodiment, the intelligence agent 135 may execute a wake up recognition module stored in the memory 130 to recognize a user's call. Accordingly, the processor 120 may recognize a wake up command of the user through the wakeup recognition module, and execute the intelligence agent 135 for receiving a user input if receiving the wake up command. The wake up recognition module may be implemented with a low-power processor (e.g., a processor included in an audio codec). According to an embodiment, if receiving a user input through a hardware key, the processor 120 may execute the intelligence agent 135. If the intelligence agent 135 is executed, an intelligence app (e.g., a voice recognition app) interworking with the intelligence agent 135 may be executed.

According to an embodiment, the intelligence agent 135 may include a voice recognition module for executing a user input. The processor 120 may recognize a user input for execute an action in the app through the voice recognition module. For example, the processor 120 may recognize a limited user (voice) input (e.g., a speech such as "click" for executing a photographing action if a camera app is running) for executing an action such as the wake up command in the plurality of the apps 131 and 133 through the voice recognition module. The processor 120 may assist the intelligence server 200 and thus recognize and rapidly process a user command processable in the user terminal 100 through the voice recognition module. According to an embodiment, the voice recognition module of the intelligence agent 135 for executing the user input may be implemented at an app processor.

According to an embodiment, the voice recognition module (including the voice recognition module of the wake up module) of the intelligence agent 135 may recognize a user input using an algorithm for recognizing a voice. The algorithm used to recognize the voice may be at least one of, for example, a hidden markov model (HMM) algorithm, an artificial neural network (ANN) algorithm, or a dynamic time warping (DTW) algorithm.

According to an embodiment, the processor 120 may convert the user's voice input to text data by executing the intelligence agent 135. For example, the processor 120 may transmit a user's voice to the intelligence server 200 through the intelligence agent 135, and receive text data corresponding to the user's voice from the intelligence server 200. Thus, the processor 120 may display the converted text data on the display 161.

According to an embodiment, the processor 120 may receive a path rule from the intelligence server 200 by executing the intelligence agent 135. According to an embodiment, the processor 120 may transfer the path rule to the execution manager module 137 through the intelligence agent 135.

According to an embodiment, the processor 120 may transfer to the intelligence service module 139 an execution result log according to the path rule received from the intelligence server 200 by executing the intelligence agent 135, and the transferred execution result log may be accumulated and managed in user's preference information of a persona module 139b.

According to an embodiment, the processor 120 may execute the plurality of the apps 131 and 133 by receiving a path rule from the intelligence agent 135 by executing the execution manager module 137, and enable the plurality of the apps 131 and 133 to execute the actions 131b and 133b included in the path rule. For example, the processor 120 may transmit command information (e.g., path rule information) for executing the actions 131b and 133b to the plurality of the apps 131 and 133 through the execution manager module 137, and receive completion information of the actions 131b and 133b from the plurality of the apps 131 and 133.

According to an embodiment, the processor 120 may transfer command information (e.g., path rule information) for executing the actions 131b and 133b of the plurality of the apps 131 and 133 between the intelligence agent 135 and the plurality of the apps 131 and 133 by executing the execution manager module 137. The processor 120 may bind the plurality of the apps 131 and 133 to execute according to the path rule through the execution manager module 137, and transfer command information (e.g., path rule information) of the actions 131b and 133b included in the path rule to the plurality of the apps 131 and 133. For example, the processor 120 may sequentially execute the actions 131b and 133b of the plurality of the apps 131 and 133 according to the path rule, by sequentially transmitting the actions 131b and 133b included in the path rule to the plurality of the apps 131 and 133 through the execution manager module 137.

According to an embodiment, the processor 120 may manage an execution state of the actions 131b and 133b of the plurality of the apps 131 and 133 by executing the execution manager module 137. For example, the processor 120 may receive information of the execution state of the actions 131b and 133b from the plurality of the apps 131 and 133 through the execution manager module 137. If the execution state of the actions 131b and 133b is, for example, partial landing (e.g., if a parameter necessary for the actions 131b and 133b is not inputted), the processor 120 may transfer information of the partial landing to the intelligence agent 135 through the execution manager module 137. The processor 120 may request the user to input necessary information (e.g., parameter information), using the information received through the intelligence agent 135. If the execution state of the actions 131b and 133b is, for example, an operating state, the processor 120 may receive speech from the user through the intelligence agent 135. The processor 120 may transfer the plurality of the apps 131 and 133 being executed through the execution manager module 137 and information of the execution state of the plurality of the apps 131 and 133 to the intelligence agent 135. The processor 120 may transmit the user speech to the intelligence server 200 through the intelligence agent 135. The processor 120 may receive parameter information of the user's speech from the intelligence server 200 through the intelligence agent 135. The processor 120 may transfer the parameter information received through the intelligence agent 135 to the execution manager module 137. The execution manager module 137 may change the parameter of the actions 131b and 133b with a new parameter using the received parameter information.

According to an embodiment, the processor 120 may transfer parameter information included in the path rule to the plurality of the apps 131 and 133 by executing the execution manager module 137. If the plurality of the apps 131 and 133 is sequentially executed according to the path rule, the execution manager module 137 may transfer the parameter information included in the path rule from one app to another app.

According to an embodiment, the processor 120 may receive a plurality of path rules by executing the execution manager module 137. The processor 120 may select the plurality of the path rules based on user's speech through the execution manager module 137. For example, if the user's speech has specifies some app 131 for executing some action 131a through the execution manager module 137, but does not specify another app 133 for executing the remaining action 133b, the processor 120 may receive a plurality of different path rules by which the same app 131 (e.g., a gallery app) for executing some action 131a is executed and a different app 133 (e.g., a message app, a telegram app) for executing the remaining action 133b is executed. The processor 120 may execute, for example, the same actions 131b and 133b (e.g., consecutive identical actions 131b and 133b) of the plurality of the path rules through the execution manager module 137. If executing up to the same action, the processor 120 may display a state screen for selecting the different apps 131 and 133 included in the plurality of the path rules respectively through the execution manager module 137 on the display 161.

According to an embodiment, the intelligence service module 139 may include a context module 139a, a persona module 139b, or a suggestion module 139c.

The processor 120 may collect current states of the plurality of the apps 131 and 133 from the plurality of the apps 131 and 133 by executing the context module 139a. For example, the processor 120 may receive context information indicating the current states of the plurality of the apps 131 and 133 by executing the context module 139a, and collect the current states of the plurality of the apps 131 and 133 through the received context information.

The processor 120 may manage personal information of the user who uses the user terminal 100 by executing the persona module 139b. For example, the processor 120 may collect use information and execution result of the user terminal 100 by executing the persona module 139b, and manage the user's personal information using the collected use information and execution result of the user terminal 100.

The processor 120 may predict a user's intent by executing the suggestion module 139c, and recommend a command to the user based on the user's intent. For example, the processor 120 may recommend a command to the user according to a user's current state (e.g., a time, a place, a situation and an app) by executing the suggestion module 139c.

Figure 4:
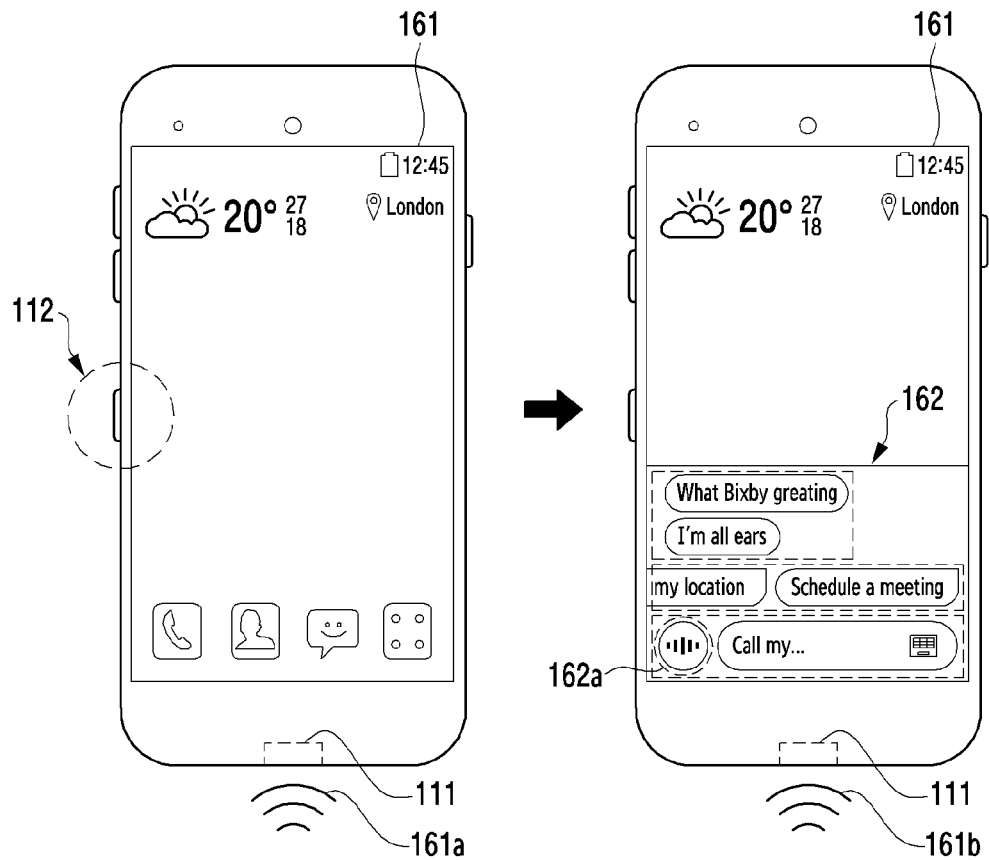
FIG. 4 is a diagram illustrating executing an intelligence app of a user terminal according to an embodiment of the present invention.

FIG. 4 is a diagram illustrating executing an intelligence app of a user terminal according to an embodiment of the present invention.

Referring to FIG. 4, the user terminal 100 receives a user input and executes an intelligence app (e.g., a voice recognition app) interworking with the intelligence agent 135.

According to an embodiment, the user terminal 100 may execute the intelligence app for recognizing a voice through a hardware key 112. For example, if receiving the user input through the hardware key 112, the user terminal 100 may display a user interface (UI) 162 of the intelligence app on the display 161. The user may, for example, touch a voice recognition button 162a in the UI 162 of the intelligence app to input 161b a voice while the UI 162 of the intelligence app is displayed on the display 161. The user may, as another example, input 161b a voice by continuously pressing the hardware key 112 to input 161b the voice.

According to an embodiment, the user terminal 100 may execute an intelligence app for recognizing a voice through a microphone 111. For example, if a designated voice 161a (e.g., wake up!) is inputted through the microphone 111, the user terminal 100 may display the UI 162 of the intelligence app on the display 161.

Figure 5:
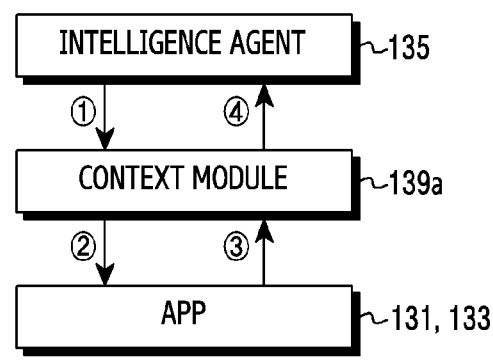
FIG. 5 is a diagram illustrating that a context module of an intelligence service module collects a current state according to an embodiment of the present invention.

FIG. 5 is a diagram illustrating that context module of an intelligence service module collects a current state according to an embodiment of the present invention.

Referring to FIG. 5, if receiving a context request from the intelligence agent 135 (①), the processor 120 may request context information indicating the current states of the plurality of the apps 131 and 133 through the context module 139a (②). According to an embodiment, the processor 120 may receive the context information from the plurality of the apps 131 and 133 through the context module 139a (③) and transmit the context information to the intelligence agent 135 (④).

According to an embodiment, the processor 120 may receive a plurality of context information from the plurality of the apps 131 and 133 through the context module 139a.

The context information may be, for example, information relating to the plurality of the apps 131 and 133 executed most recently. The context information may be, as another example, information relating to the current state within the plurality of the apps 131 and 133 (e.g., information of a corresponding picture if the user views a picture in a gallery).

According to an embodiment, the processor 120 may receive context information indicating the current state of the user terminal 100 from a device platform. For example, the context information may include general context information, user context information, or device context information.

According to an embodiment, the general context information may include general information of the user terminal 100. The general context information may be identified through an internal algorithm by receiving data through a sensor hub of the device platform. For example, the general context information may include information of a current space and time. The information of the current space and time may include, for example, current time or current location information of the user terminal 100. The current time may be identified through the time on the user terminal 100, and the current location information may be identified through a global positioning system (GPS). As another example, the general context information may include physical motion information. The physical motion information may include information relating to, for example, walking, running, or driving. The physical motion information may be identified through a motion sensor. The driving information may identify driving through the motion sensor, or identify boarding and parking by sensing Bluetooth connection of a vehicle. As another example, the general context information may include user activity information. The user activity information may include information relating to, for example, commuting, shopping, or traveling. The user activity information may be identified using information relating to a place which the user or the app registers in a database.

According to an embodiment, the user context information may include information of the user. For example, the user context information may include information of a user's emotional state. The emotional state information may include information relating to, for example, happiness, sadness, or anger of the user. As another example, the user context information may include information of the user's current state. The current state information may include information relating to, for example, an interest or intent (e.g., shopping).

According to an embodiment, the device context information may include state information of the user terminal 100. For example, the device context information may include information of the path rule executed by the execution manager module 137. As another example, the device information may include battery information. The battery information may be identified through, for example, charging and discharging states of the battery. As another example, the device information may include information of a connected device or network. The connected device information may be identified through, for example, a communication interface to which the device is connected.

Figure 6:
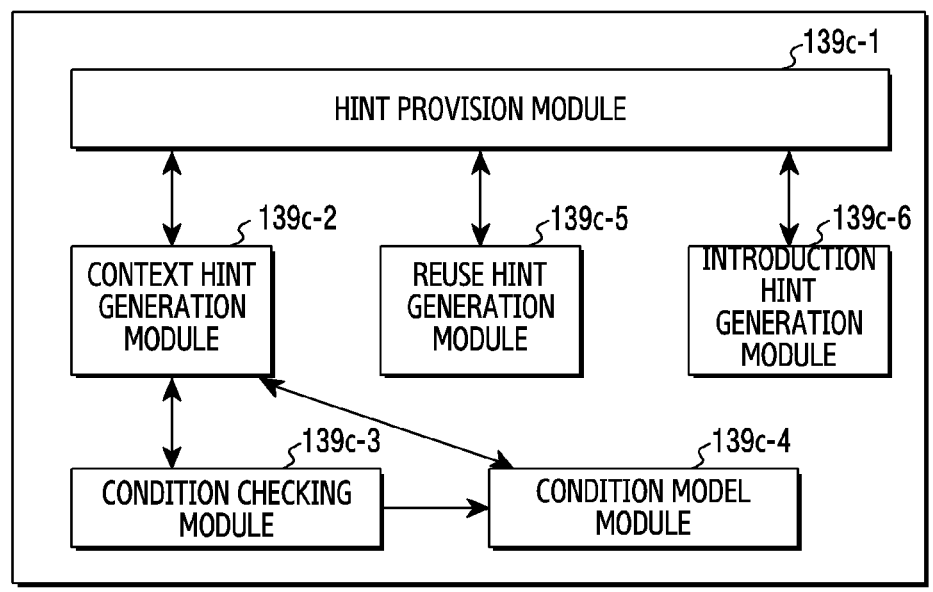
FIG. 6 is a block diagram illustrating a suggestion module of an intelligence service module according to an embodiment of the present invention.

FIG. 6 is a block diagram illustrating a suggestion module of an intelligence service module according to an embodiment of the present invention.

Referring to FIG. 6, the suggestion module 139c may include a hint provision module 139c-1, a context hint generation module 139c-2, a condition checking module 139c-3, a condition model module 139c-4, a reuse hint generation module 139c-5, or an introduction hint generation module 139c-6.

According to an embodiment, the processor 120 may provide a hint to the user by executing the hint provision module 139c-1. For example, the processor 120 may receive a hint generated from the context hint generation module 139c-2, the reuse hint generation module 139c-5, or the introduction hint generation module 139c-6 through the hint provision module 139c-1 and provide the hint to a user.

According to an embodiment, the processor 120 may generate a hint to be recommended according to the current state by executing the condition checking module 139c-3 or the condition model module 139c-4. The processor 120 may receive information corresponding to the current state by executing the condition checking module 139c-3, and set a condition model using the received information by executing the condition model module 139c-4. For example, the processor 120 may obtain a time, a location, a situation and an app being used if the hint is provided to the user by executing the condition model module 139c-4, and provide the user with hint which is likely to be used under a corresponding condition in descending order of priority.

According to an embodiment, the processor 120 may generate a hint to be recommended based on a frequency of use by executing the reuse hint generation module 139c-5. For example, the processor 120 may generate a hint based on a user's use pattern by executing the reuse hint generation module 139c-5.

According to an embodiment, the introduction hint generation module 139c-6 may generate a hint which introduces the user to a new function or a function used frequently by other user. For example, the hint for introducing the new function may include introduction (e.g., an operating method) of the intelligence agent 135.

According to another embodiment, the context hint generation module 139c-2, the condition checking module 139c-3, the condition model module 139c-4, the reuse hint generation module 139c-5, or the introduction hint generation module 139c-6 of the suggestion module 139c may be included in the personal information server 300. For example, the processor 120 may receive a hint from the context hint generation module 139c-2, the reuse hint generation module 139c-5, or the introduction hint generation module 139c-6 of the user personal information server 300 through the hint provision module 139c-1 of the suggestion module 139c and provide the received hint to the user.

According to an embodiment, the user terminal 100 may provide a hint according to a series of the following processes. For example, if receiving a hint provision request from the intelligence agent 135, the processor 120 may transmit a hint generation request to the context hint generation module 139c-2 through the hint provision module 139c-1. If receiving the hint generation request, the processor 120 may receive information corresponding to a current state from the context module 139a and the persona module 139b through the condition checking module 139c-3. The processor 120 may transfer the information received through the condition checking module 139c-3 to the condition model module 139c-4, and assign a priority to hints among hints provided to the user in descending order of usability using the information through the condition model module 139c-4. The processor 120 may identify the condition through the context hint generation module 139c-2 (⑥), and generate a hint corresponding to the current state. The processor 120 may transfer the generated hint to the hint provision module 139c-1 through the context hint generation module 139c-2. The processor 120 may arrange the hint according to a designated rule through the hint provision module 139c-1, and transfer the hint to the intelligence agent 135.

According to an embodiment, the processor 120 may generate a plurality of context hints through the hint provision module 139c-1, and designate the priority to the plurality of the context hints according to a designated rule. According to an embodiment, the processor 120 may provide the user first with a context hint of the high priority among the plurality of the context hints through the hint provision module 139c-1.

According to an embodiment, the user terminal 100 may suggest a hint according to the frequency of the use. For example, if receiving the hint provision request from the intelligence agent 135, the processor 120 may transfer a hint generation request to the reuse hint generation module 139c-5 through the hint provision module 139c-1. If receiving the hint generation request, the processor 120 may receive user information from the persona module 139b through the reuse hint generation module 139c-5. For example, the processor 120 may receive a path rule included in user's preference information of the persona module 139b, a parameter included in the path rule, an execution frequency of an app, or time and space information where the app is used through the reuse hint generation module 139c-5. The processor 120 may generate a hint corresponding to the received user information through the reuse hint generation module 139c-5. The processor 120 may transmit the generated hint to the hint provision module 139c-1 through the reuse hint generation module 139c-5. The processor 120 may arrange the hint through the hint provision module 139c-1, and transfer the hint to the intelligence agent 135.

According to an embodiment, the user terminal 100 may suggest a hint for a new function. For example, if receiving a hint provision request from the intelligence agent 135, the processor 120 may transfer a hint generation request to the introduction hint generation module 139c-6 through the hint provision module 139c-1. The processor 120 may receive information of a function to be introduced from the suggestion server 400 by transferring the introduction hint provision request from the suggestion server 400 through the introduction hint generation module 139c-6. The suggestion server 400 may, for example, store information of the function to be introduced, and a hint list for the function to be introduced may be updated by a service operator. The processor 120 may transfer the generated hint to the hint provision module 139c-1 through the introduction hint generation module 139c-6. The processor 120 may arrange the hint through the hint provision module 139c-1, and transmit the hint to the intelligence agent 135 (⑥).

Hence, the processor 120 may provide the user with the hint generated in the context hint generation module 139c-2, the reuse hint generation module 139c-5, or the introduction hint generation module 139c-6 through the suggestion module 139c. For example, the processor 120 may display the generated hint in an app which operates the intelligence agent 135 through the suggestion module 139c, and receive an input for selecting the hint from the user through the app.

Figure 7:
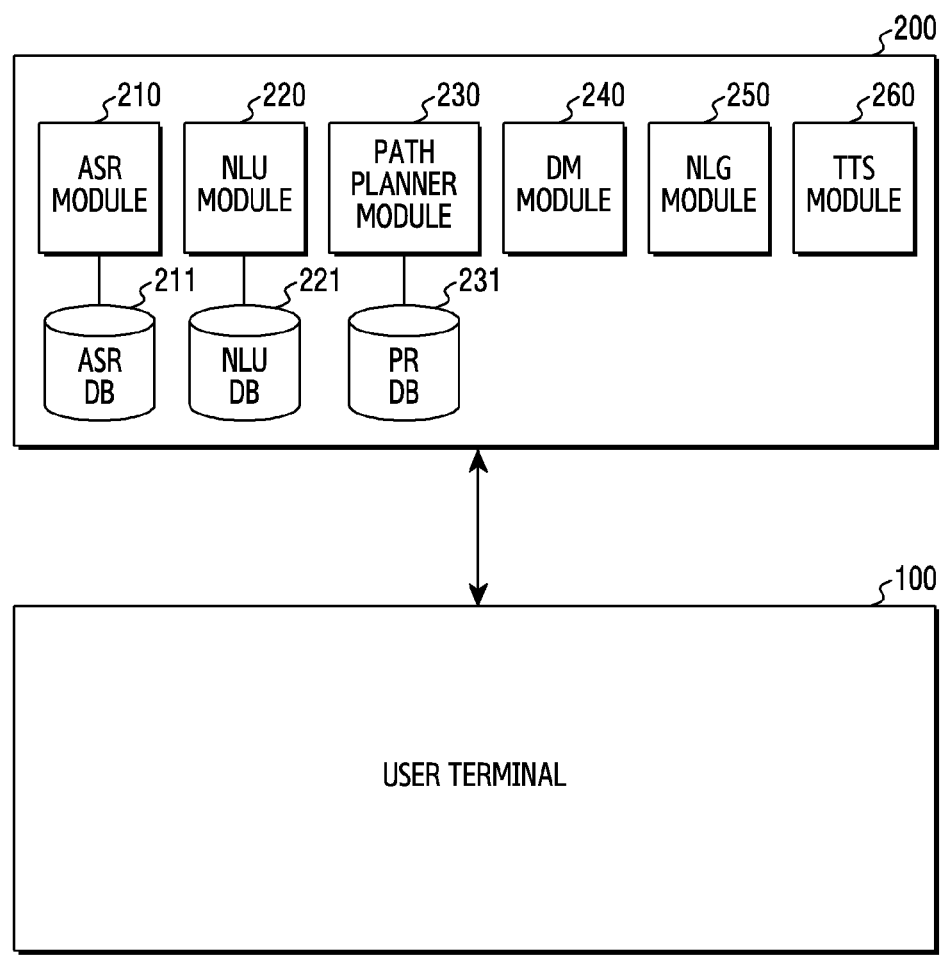
FIG. 7 is a block diagram illustrating an intelligence server of an integrated intelligence system according to an embodiment of the present invention.

FIG. 7 is a block diagram illustrating an intelligence server of an integrated intelligence system according to an embodiment of the present invention.

Referring to FIG. 7, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260. According to an embodiment, the intelligence server 200 may include a communication circuit, a memory, and a processor. The processor may drive the ASR module 210, the NLU module 220, the path planner module 230, the DM module 240, the NLG module 250, or the TTS module 260 by executing instructions stored in the memory. The intelligence server 200 may transmit and receive data (or information) to and from an external electronic device (e.g., the user terminal 100) through the communication circuit.

The NLU module 220 or the path planner module 230 of the intelligence server 200 may generate a path rule.

According to an embodiment, the ASR module 210 may convert a user input received from the user terminal 100 to text data.

According to an embodiment, the ASR module 210 may convert a user input received from the user terminal 100 to text data. For example, the ASR module 210 may include a speech recognition module. The speech recognition module may include an acoustic model or a language model. For example, the acoustic model may include information related to utterance, and the language model may include unit phoneme information or information relating to a combination of the unit phoneme information. The speech recognition module may convert the user speech to the text data by using the utterance information or the combination information of the unit phoneme information. The information relating to the acoustic model or the language model may be stored in an automatic speech recognition database (ASR DB) 211.

According to an embodiment, the NLU module 220 may obtain user's intent by conducting syntactic analysis or semantic analysis. The syntactic analysis may divide the user input into syntactic units (e.g., words, phrases, morphemes, etc.), and obtain which syntactic elements the divided units are. The semantic analysis may be performed by using semantic matching, rule matching, or formula matching. Thus, the NLU module 220 may obtain a domain, an intent, or a parameter (or a slot) required to the user input to express the intent.

According to an embodiment, the NLU module 220 may determine the user's intent and the parameter by using the matching rule which is divided into the domain, the intend, and the parameter (or a slot) required to obtain the intent. For example, the one domain (e.g., an alarm) may include a plurality of intents (e.g., alarm setting or alarm release, etc.), and one intent may include a plurality of parameters (e.g., a time, the number of iterations, an alarm sound, etc.). For example, a plurality of rules may include, for example, one or more necessary parameters. The matching rule may be stored in a natural language understanding database (NLU DB) 221.

According to an embodiment, the NLU module 220 may obtain meaning of words extracted from the user input using linguistic features (e.g., grammatical elements) such as morphemes or phrases, and determine the user's intent by matching the obtained meaning of the words to the domain and the intent. For example, the NLU module 220 may determine the user intent by calculating how many words extracted from the user input are included in each of the domain and the intent. According to an embodiment, the NLU module 220 may determine a parameter of the user input by using the word used to obtain the intent. According to an embodiment, the NLU module 220 may determine the user intent by using the NLU DB 221 storing the linguistic features to obtain the intent of the user input. According to another embodiment, the NLU module 220 may determine the user intent by using a personal language model (PLM). For example, the NLU module 220 may determine the user intent by using personalized information (e.g., a contact list or a music list). For example, the PLM may be stored in, for example, the NLU DB 221. According to an embodiment, not only the NLU module 220 but also the ASR module 210 may recognize a user's voice by referring to the PLM stored in the NLU DB 221.

According to an embodiment, the NLU module 220 may generate a path rule based on the intent of the user input and the parameter. For example, the NLU module 220 may select an app to be executed based on the intent of the user input, and determine an action to be executed in the selected app. The NLU module 220 may generate the path rule by determining the parameter corresponding to the determined action. According to an embodiment, the path rule generated by the NLU module 220 may include information relating to the app to be executed, the action (e.g., at least one or more states) to be executed in the app, and a parameter required to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230, and determine the path rule by mapping the intent of the user input and the parameter to the received path rule set.

According to another embodiment, the NLU module 220 may generate one path rule or a plurality of path rules by determining the app to be executed, the action to be executed in the app, and the parameter required to execute the action based on the intent of the user input and the parameter. For example, the NLU module 220 may generate the path rule by arranging the app to be executed and the action to be executed in the app in the form of ontology or a graph model according to the intent of the user input using information of the user terminal 100. For example, the generated path rule may be stored in, for example, a path rule database (PR DB) 231 through the path planner module 230. The generated path rule may be added to the path rule set of the DB 231.

According to an embodiment, the NLU module 220 may select at least one path rule of the plurality of the generated path rules. For example, the NLU module 220 may select an optimal path rule of the plurality of the path rules. As another example, if only some action is specified based on the user speech, the NLU module 220 may select a plurality of path rules. The NLU module 220 may determine one path rule of the plurality of the path rules based on a user's additional input.

According to an embodiment, the NLU module 220 may transmit the path rule to the user terminal 100 in response to a request for the user input. For example, the NLU module 220 may transmit one path rule corresponding to the user input to the user terminal 100. As another example, the NLU module 220 may transmit the plurality of path rules corresponding to the user input to the user terminal 100. For example, if only some action is specified based on the user speech, the plurality of path rules may be generated by the NLU module 220.

According to an embodiment, the path planner module 230 may select at least one path rule of the plurality of the path rules.

According to an embodiment, the path planner module 230 may transfer the path rule set including the plurality of the path rules to the NLU module 220. The plurality of the path rules of the path rule set may be stored in the PR DB 231 connected to the path planner module 230 in the form of a table. For example, the path planner module 230 may transfer the path rule set corresponding to the information (e.g., OS information or app information) of the user terminal 100 received from the intelligence agent 151 to the NLU module 220. For example, a table stored in the PR DB 231 may be stored for, for example, each domain or each version of the domain.

According to an embodiment, the path planner module 230 may select one path rule or the plurality of path rules from the path rule set and transfer to the NLU module 220. For example, the path planner module 230 may select one path rule or a plurality of path rules by matching the user's intent and the parameter to the path rule set corresponding to the user terminal 100 and transfer to the NLU module 220.

According to an embodiment, the path planner module 230 may generate one path rule or a plurality of path rules by using the user intent and the parameter. For example, the path planner module 230 may generate one path rule or a plurality of path rules by determining the app to be executed and the action to be executed in the app based on the user intent and the parameter. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of the path rules or the plurality of the path rule sets may reflect a kind, a version, a type, or characteristics of a device which performs each path rule.

According to an embodiment, the DM module 240 may determine whether the user intent obtained by the NLU module 220 is clear. For example, the DM module 240 may determine whether the user intent is clear based on whether the information of the parameter is sufficient. The DM module 240 may determine whether the parameter obtained by the NLU module 220 is sufficient to perform a task. According to an embodiment, if the user intent is not clear, the DM module 240 may perform a feedback for requesting necessary information from the user. For example, the DM module 240 may perform a feedback for requesting parameter information for obtaining the user intent.

According to an embodiment, the DM module 240 may include a content provider module. If executing an action based on the intent obtained by the NLU module 220 and the parameter, the content provider module may generate a result of performing a task corresponding to the user input. According to an embodiment, the DM module 240 may transmit the result generated at the content provider module as a response to the user input to the user terminal 100.

According to an embodiment, the NLG 250 may change designated information into a text form. The information changed into the text form may be in the form of a natural language speech. For example, the designated information may be information of an additional input, information for guiding completion of the action corresponding to the user input, or information for guiding the additional input of the user (e.g., feedback information relating to the user input). The information changed into the text form may be transmitted to the user terminal 100 and displayed on the display 120, or may be transmitted to the TTS module 260 and changed into a voice form.

According to an embodiment, the TTS module 260 may change information of the text form to information of the voice form. The TTS module 260 may receive the information of the text form from the NLG module 250, change the information of the text form to the information of the voice form, and transmit to the user terminal 100. The user terminal 100 may output the information of the voice form to the speaker 156.

According to an embodiment, the NLU module 220, the path planner module 230, and the DM module 240 may be implemented as one module. For example, the NLU module 220, the path planner module 230 and the DM module 240 may be implemented as one module to determine the user intent and the parameter, and to generate a response (e.g., a path rule) corresponding to the determined user intent and the parameter. Hence, the generated response may be transmitted to the user terminal 100.

Figure 8:
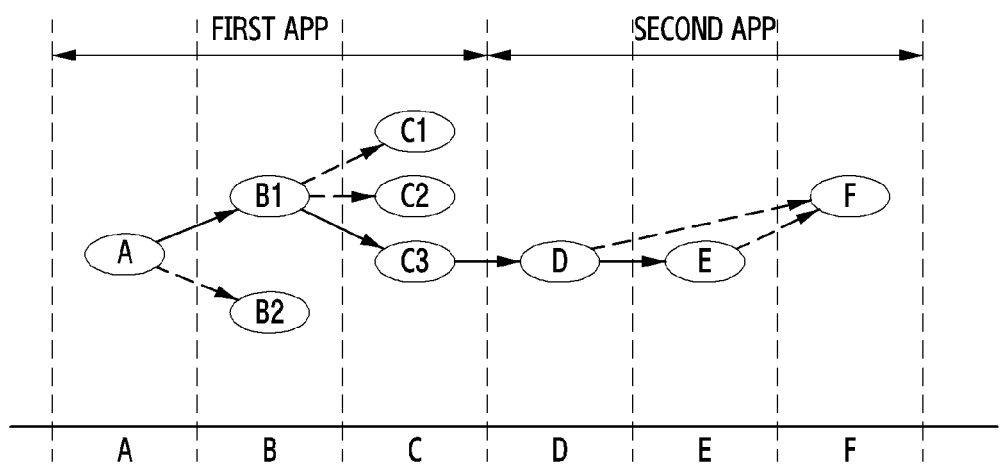
FIG. 8 is a diagram illustrating a method for generating a path rule at a path natural language understanding (NLU) module according to an embodiment of the present invention.

FIG. 8 is a diagram illustrating a method for generating a path rule of a path planner module according to an embodiment of the present invention.

Referring to FIG. 8, according to an embodiment, the NLU module 220 may divide a function of an app into any one action (e.g., a state A through a state F) and store in the PR DB 231. For example, the NLU module 220 may store a path rule set including a plurality of path rules A-B1-C1, A-B1-C2, A-B1-C3-D-F, and A-B1-C3-D-E-F divided into any one action (e.g., state) in the PR DB 231.

According to an embodiment, the PR DB 231 of the path planner module 230 may store the path rule set for performing the function of the app. The path rule set may include a plurality of path rules including a plurality of actions (e.g., a sequence of states). The plurality of the path rules may sequentially arrange actions executed according to a parameter inputted to the plurality of actions respectively. According to an embodiment, the plurality of the path rules may be configured in the form of ontology or a graph model and stored in the PR DB 231.

According to an embodiment, the NLU module 220 may select an optimal path rule A-B1-C3-D-F from the plurality of the path rules A-B1-C1, A-B1-C2, A-B1-C3-D-F, and A-B1-C3-D-E-F corresponding to the intent of the user input and the parameter.

According to an embodiment, if there is no path rule perfectly matched to the user input, the NLU module 220 may transfer a plurality of rules to the user terminal 100. For example, the NLU module 220 may select a path rule (e.g., A-B1) partially corresponding to the user input. The NLU module 220 may select one or more path rules (e.g., A-B1-C1, A-B1-C2, A-B1-C3-D-F, and A-B1-C3-D-E-F) including the path rule (e.g., A-B1) partially corresponding to the user input and transfer to the user terminal 100.

According to an embodiment, the NLU module 220 may select one of the plurality of the path rules based on an additional input of the user terminal 100, and transfer the selected one path rule to the user terminal 100. For example, the NLU module 220 may select one path rule (e.g., A-B1-C3-D-F) from the plurality of the path rules (e.g., A-B1-C1, A-B1-C2, A-B1-C3-D-F, and A-B1-C3-D-E-F) according to the user input (e.g., an input for selecting C3) additionally inputted at the user terminal 100 and transmit to the user terminal 100.

According to yet another embodiment, the NLU module 220 may determine a user's intent and a parameter corresponding to the user input (e.g., an input for selecting C3) additionally inputted to the user terminal 100 through the NLU module 220, and transmit the determined user intent or parameter to the user terminal 100. The user terminal 100 may select one path rule (e.g., A-B1-C3-D-F) from the plurality of the path rules (e.g., A-B1-C1, A-B1-C2, A-B1-C3-D-F, and A-B1-C3-D-E-F), based on the transmitted intent or the parameter.

Thus, the user terminal 100 may finish the actions of the plurality of the apps 131 and 133 according to the selected one path rule.

According to an embodiment, if a user input in which information is insufficient is received at the intelligence server 200, the NLU module 220 may generate a path rule partially corresponding to the received user input. For example, the NLU module 220 may transmit the partially corresponding path rule to the intelligence agent 131. The processor 120 may receive the path rule by executing the intelligence agent 135, and transfer the partially corresponding path rule to the execution manager module 137. The processor 120 may execute the first app 131 according to the path rule through the execution manager module 137. The processor 120 may execute the first app 131 through the execution manager module 137 and transmit information of the insufficient parameter to the intelligence agent 135. The processor 120 may request an additional input from the user using the information of the insufficient parameter through the intelligence agent 135. If receiving the additional input by the user through the intelligence agent 135, the processor 120 may transmit and process the additional input to the intelligence server 200. The NLU module 220 may generate a path rule added based on the intent of the user input additionally inputted and parameter information and transmit to the intelligence agent 135. The processor 120 may execute the second app 133 by transmitting the path rule to the execution manager module 137 through the intelligence agent 135.

According to an embodiment, if a user input with some information omitted is received at the intelligence server 200, the NLU module 220 may transmit a user information request to the personal information server 300. The personal information server 300 may transmit information of the user inputting the user input stored in the persona database to the NLU module 220. The NLU module 220 may select a path rule corresponding to the user input with some action omitted using the user information. Thus, even if the user input with some information omitted is received at the intelligence server 200, the NLU module 220 may determine a path rule corresponding to the user input by receiving an additional input by requesting the omitted information or by using the user information.

Table 1 attached below may show an exemplary form of a path rule related to a task requested by the user according to an embodiment.

TABLE 1

| Path rule ID | State | Parameter |
| --- | --- | --- |
| Gallery_101 | pictureView(25) | NULL |
| | searchView(26) | NULL |
| | searchViewResult(27) | Location, time |
| | SearchEmptySelectedView(28) | NULL |
| | SearchSelectedView(29) | ContentType, selectall |
| | CrossShare(30) | anaphora |

Referring to Table 1, a path rule generated or selected at an intelligence server (e.g., the intelligence server 200) according to a user speech (e.g., "Share the photo") may include at least one state 25, 26, 27, 28, 29 or 30. For example, the at least one state (e.g., any one action state of the terminal) may correspond to at least one of picture app execution (pictureView) 25, picture search function execution (searchView) 26, search result display screen output (searchViewResult) 27, search result display screen output with photo non selected (SearchEmptySelectedView) 28, search result display screen output with at least one photo selected (SearchSelectedView) 29, or shared application selection screen output (CrossShare) 30.

According to an embodiment, the parameter information of the path rule may correspond to at least one state. For example, the at least one photo may be included in the selected search result display screen output 29 state.

The task (e.g., "Share the photo!") requested by the user may be performed according to the execution result of the path rule including a sequence of states 25, 26, 27, 28, and 29.

Figure 9:
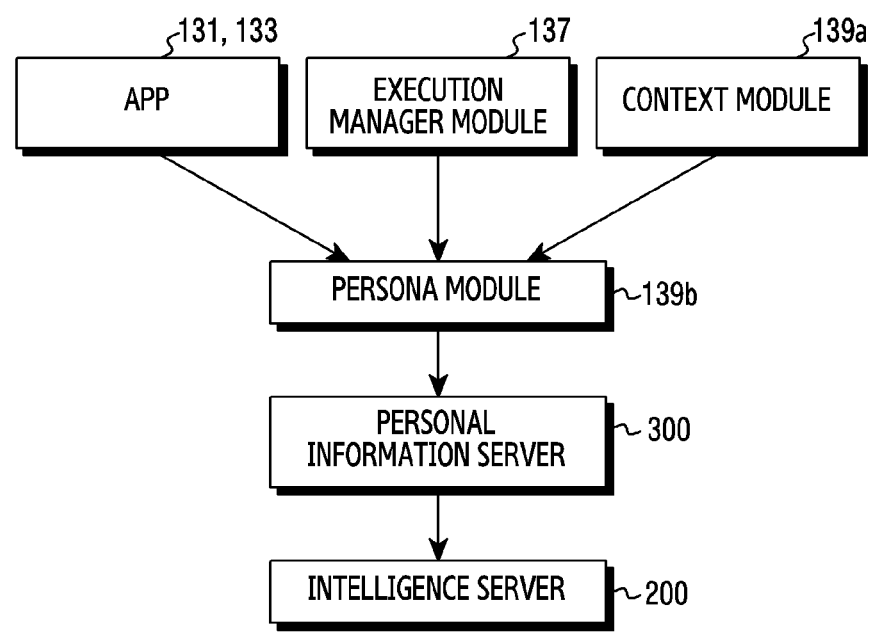
FIG. 9 is a diagram illustrating that a persona module of an intelligence service module manages user's information according to an embodiment of the present invention.

FIG. 9 is a diagram illustrating that a persona module of an intelligence service module manages user information according to an embodiment of the present invention.

Referring to FIG. 9, the processor 120 may receive information of the user terminal 100 from the plurality of the apps 131 and 433, the execution manager module 137, or the context module 139a through the persona module 139b. The processor 120 may store result information of executing the app actions 131b and 133b in an operation log database through the apps 131 and 133 and the execution manager module 137. The According to various 120 may store current state information of the user terminal 100 in a context database through the context module 139a. The processor 120 may receive the stored information from the operation log database or the context database through the persona module 139b. The data stored in the operation log database and the context database may be, for example, analyzed by an analysis engine and transferred to the persona module 139b.

According to an embodiment, the processor 120 may transmit the information received from the plurality of the apps 131 and 133, the execution manager module 137, or the context module 139a to the suggestion module 139c through the persona module 139b. For example, the processor 120 may transfer the data stored in the operation log database or context database to the suggestion module 139c through the persona module 139b.

According to an embodiment, the processor 120 may transmit the information received from the plurality of the apps 131 and 133, the execution manager module 137, or the context module 139a to the personal information server 300 through the persona module 139b. For example, the processor 120 may periodically transmit the data accumulated and stored in the operation log database or context database to the personal information server 300 through the persona module 139b.

According to an embodiment, the processor 120 may transfer the data stored in the operation log database or the context database to the suggestion module 139c through the persona module 139b. User information generated through the persona module 139b may be stored in a persona database. The persona module 139b may periodically transmit the user information stored in the persona database to the personal information server 300. According to an embodiment, the information transmitted to the personal information server 300 through the persona module 139b may be stored in the persona database. The personal information server 300 may infer user information required to generate a path rule of the intelligence server 200 using the information stored in the persona database.

According to an embodiment, the user information inferred using the information transmitted through the persona module 139b may include profile information or preference information. The profile information or the preference information may be inferred through a user's account and the accumulated information.

The profile information may include user's personal information. For example, the profile information may include user's population statistics information. The population statistics information may include, for example, a use's gender or age. As another example, the profile information may include life event information. The life event information may be inferred by, for example, comparing log information with a life event model, and reinforced by analyzing a behavior pattern. As another example, the profile information may include interest information. The interest information may include, for example, shopping goods of interest or a field of interest (e.g., sports, politics, etc.). As another example, the profile information may include activity region information. The activity region information may include, for example, information relating to a home or a workplace. The activity region information may include not only location information of the place but also information relating to regions recorded with priorities based on an accumulated time of stay and a visit count. As another example, the profile information may include activity time information. The activity time information may include, for example, information relating to a wakeup time, a commute time, or a sleep time. The commute time information may be inferred using the activity region information (e.g., home or workplace information). The sleep time information may be inferred through an unused time of the user terminal 100.

The preference information may include user's preference information. For example, the preference information may include app preference information. The app preference may be inferred through, for example, a use record (e.g., a use record per time or place) of an app. The app preference may be used to determine an app to be executed according to a user's current state (e.g., a time or pa lace). For example, the preference information may include contacts preference information. The contacts preference may be inferred by, for example, analyzing contact frequency (e.g., contact frequency per time or per place) information of contacts. The contacts preference may be used to determine contacts to contact according to the user's current state (e.g., contact to an overlapping name). As another example, the preference information may include setting information. The setting information may be inferred by, for example, analyzing setting frequency (e.g., frequency set as a setting value by time or place) information of a particular setting value. The setting information may be used to set the particular setting value according to the user's current state (e.g., a time, a place, or a context). As another example, the preference information may include place preference. The place preference may be inferred through, for example, a record of visits to a particular place (e.g., a record of visits per time). The place preference may be used to determine a place which the user is visiting according to the user's current state (e.g., time). For example, the preference information may include command preference. The command preference may be inferred through, for example, a command use frequency (e.g., a use frequency per time or place). The command preference may be used to determine a command pattern to be used according to the user's current state (e.g., time or place). In particular, the command preference may include information of a menu selected most by the user in the current state of the app executed by analyzing log information.

The electronic device according to various embodiments disclosed in the present document may be a device of various types. The electronic device may include at least one of, for example, a portable communication device (e.g., a smartphone), a computer device, a portable multimedia device, a portable medical device, a camera, a wearable device, or a home appliance. The electronic device according to an embodiment of the disclosure is not limited to those described above.

It should be appreciated that various embodiments of the disclosure and the terms used therein are not intended to limit the techniques set forth in the disclosure to particular embodiments, but include various changes, equivalents, and/or alternatives of corresponding embodiments. With regard to descriptions of drawings, like reference numerals may be used for similar components. The singular expression may include a plural expression, unless the context clearly dictates otherwise. In the present disclosure, an expression such as "A or B", "at least one of A and/or B", "A, B, or C", or "at least one of A, B, and/or C" may include all possible combinations of items listed. Expressions such as "first", "second", "primarily" or "secondary" may represent corresponding elements regardless of order or importance, are merely used to distinguish one element from other element, and do not limit corresponding elements. If it is described that an element (e.g., a first element) is "(operatively or communicatively) coupled" to or "connected" to another element (e.g., a second element), the element may be directly connected to the other element or may be connected through another element (e.g., a third element).

The term "module" used in the present disclosure includes a unit configured in hardware, software, or firmware, and may interchangeably be used with a term, for example, logic, logic block, part, or circuit. A module may be a single integral part or a minimum unit or part for performing one or more functions. For example, the module may be configured with an application-specific integrated circuit (ASIC).

Various embodiments of the present disclosure may be implemented as software (e.g., the program 140) including commands stored in machine (e.g., computer)-readable storage media (e.g., an internal memory 136 or an external memory 138). The machine is a device for invoking a command stored in the storage medium and operating according to the invoked command, and may include an electronic device (e.g., the electronic device 101) according to embodiments disclosed. If the command is executed by a processor (e.g., the processor 120), the processor may perform a function corresponding to the command on its own or using other components under control of the processor. The command may include a code generated or executed by a compiler or an interpreter. The machine-readable storage media may be provided in the form of a non-transitory storage medium. Herein, the term 'non-transitory' simply means that the storage medium does not include a signal and is tangible, but does not differentiate semi-permanently or temporarily storing data in the storage medium.

According to an embodiment, a method according to various embodiments of the present disclosure may be included and provided in a computer program product. The computer program product may be traded as commodities between a seller and a buyer. The computer program product may be distributed in the form of a machine-readable storage medium (e.g., a compact disc read only memory (CD-ROM)), or online through an application store (e.g., Playstore™). If distributed online, at least part of the computer program product may be at least temporarily stored in a storage medium such as a server of a manufacturer, a server of the application store, or a memory of a relay server, or may be generated temporarily.

Each component (e.g., a module or program) according to various embodiments may be configured a single or multiple entities, some sub component of the above-mentioned corresponding sub components may be omitted, or other sub component may be further included in various embodiments. Alternatively or additionally, some components (e.g., modules or programs) may be integrated into a single entity, to perform functions performed by corresponding components respectively before being integrated in the same or similar manner. According to various embodiments, operations performed by modules, programs, or other components may be carried out sequentially, in parallel, repeatedly, heuristically, or at least some operations may be executed in a different order, or omitted, or other operation may be added.

According to various embodiments of the present invention, an electronic device (e.g., the electronic device 101 of FIG. 1) includes an input device (e.g., the input device 150 of FIG. 1); a display (e.g., the display 161 of FIG. 3); and a processor (e.g., the processor 120 of FIG. 1), wherein the processor may be configured to detect a voice command (e.g., a voice command 1103 of FIG. 11A) of a user using the input device, if outputting an electronic document corresponding to the voice command, identify at least one input field (e.g., a departure station input field 1105 of FIG. 11A) in the electronic document, determine guide information (e.g., guide information 1106 of FIG. 11A) based on information of the at least one input field, and display the electronic document including the guide information using the display.

According to various embodiments, the processor may be configured to display data in the at least one input field based on at least part of the voice command using the display, and if there is a blank input field (e.g., a password input field 1309 of FIG. 13) in the at least one input field, display designated data in the blank input field based on a use history using the display.

According to various embodiments, the information of the input field may include texts or identification information related to the at least one input field.

According to various embodiments, the processor may be configured to extract part of the texts related to the at least one input field based on a priority, and determine the extract part as the guide information.

According to various embodiments, the processor may be configured to extract guide information corresponding to any one input field of the at least one input field based on a priority, and if the detected guide information overlaps with guide information corresponding to other input field of the at least one input field, detect other guide information corresponding to the any one input field based on a next priority.

According to various embodiments, the processor may configured to extract an additional voice command of the user using the input device, if part of the additional voice command matches the guide information, display data in an input field corresponding to the matched guide information using the display, and if the part of the additional voice command does not match the guide information, display a guide message using the display.

According to various embodiments, the processor may be configured to apply a graphic effect to the guide information such that the guide information is highlighted relative to at least one object in the electronic document.

According to various embodiments, the processor may be configured to detect an additional voice command of the user using the input device, and if the additional voice command contains a continue command, sequentially display data contained the additional voice command in the at least one input field based on the continue command using the display.

According to various embodiments, the processor may be configured to detect an additional voice command of the user using the input device, and if detecting a modify command in the additional voice command, change data displayed in the at least one input field based on the modify command.

According to various embodiments, the processor may be configured to detect an additional voice command of the user using the input device, display data contained the additional voice command in the at least one input field corresponding to the additional voice command using the display, if there is no blank input field in the at least one input field, output additional guide information, detect a voice command corresponding to the additional guide information, and execute a function corresponding to the voice command corresponding to the additional guide information.

Figure 10:
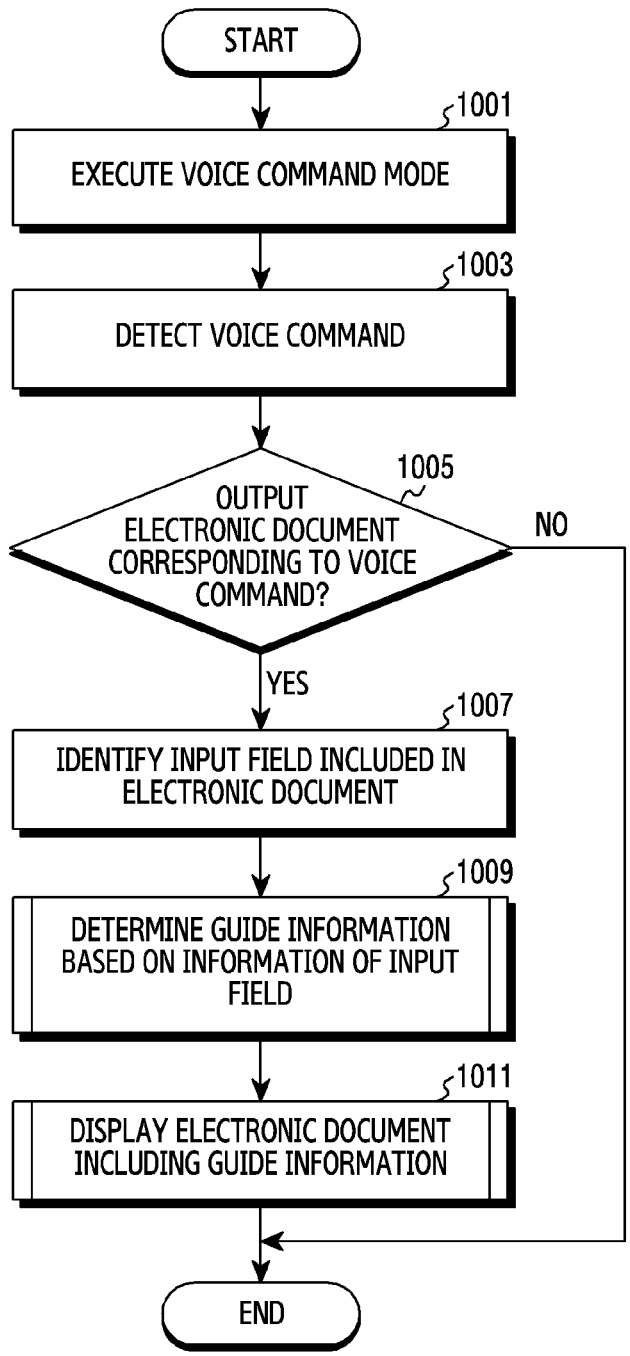
FIG. 10 illustrates a flowchart for displaying an electronic document including guide information for a user's voice command in an electronic device according to various embodiments of the present invention.
Figure 11A:
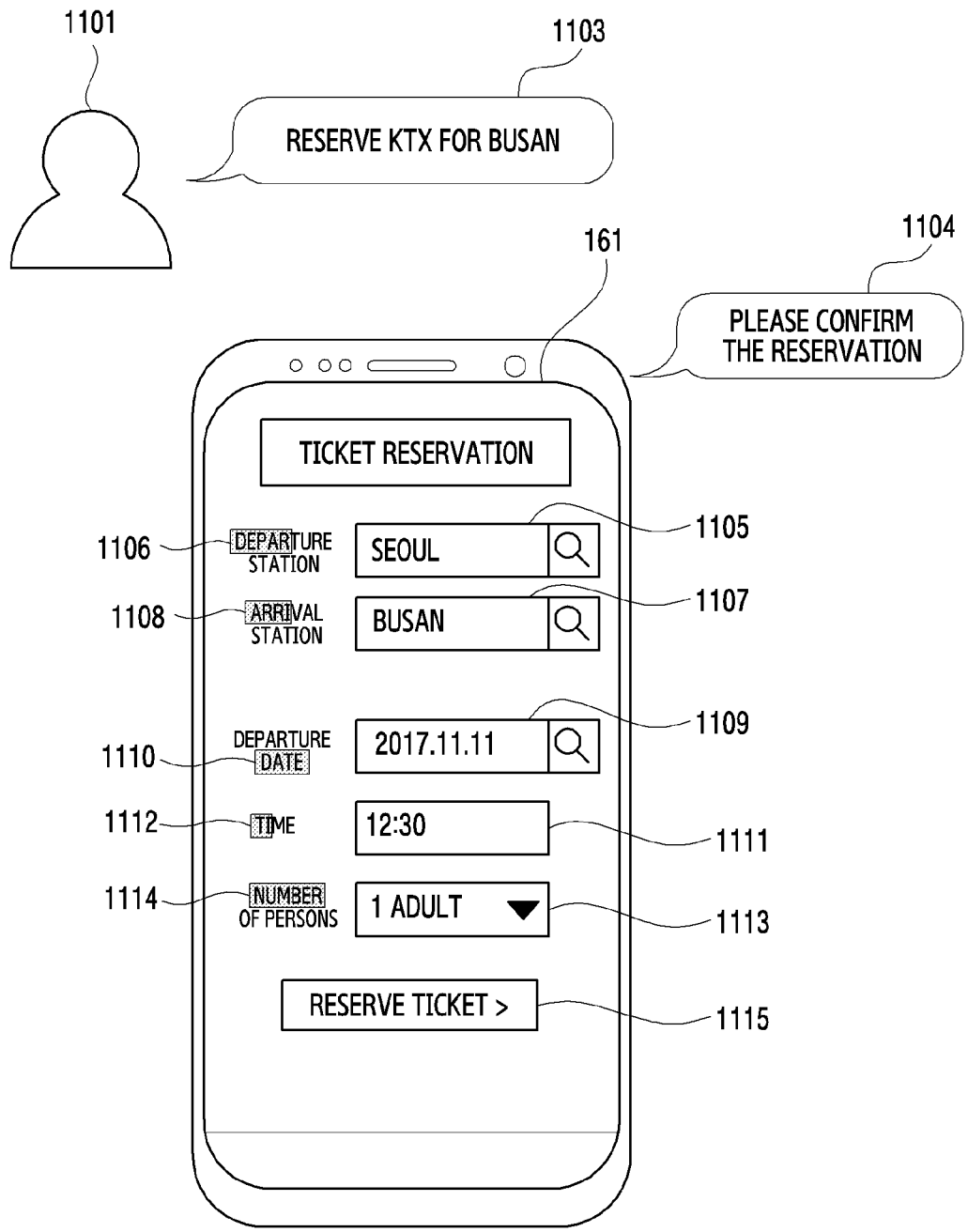
FIG. 11A through FIG. 11C illustrate exemplary diagrams for displaying an electronic document including guide information for a user's voice command in an electronic device according to various embodiments of the present invention.
Figure 11B:
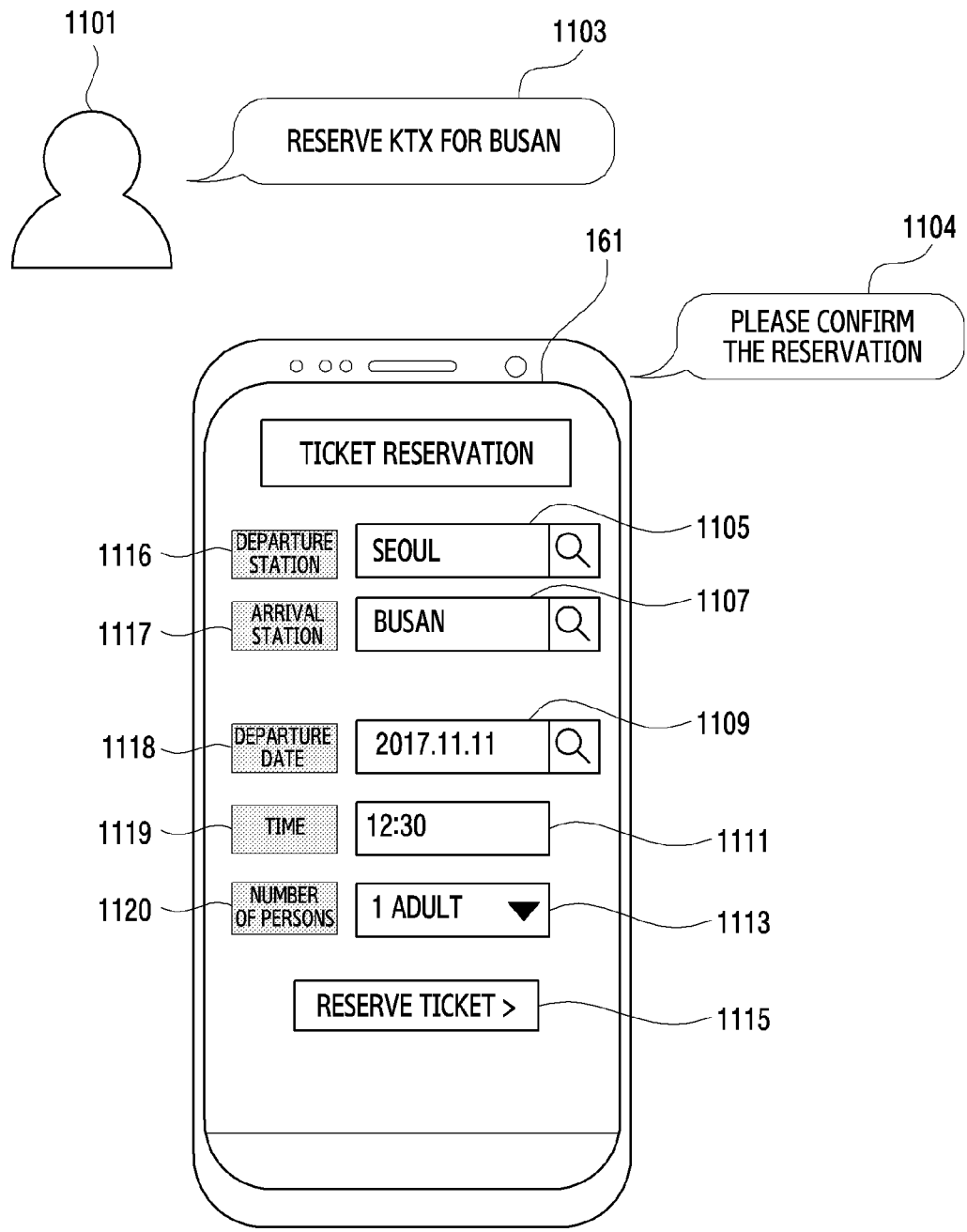
Figure 11C:
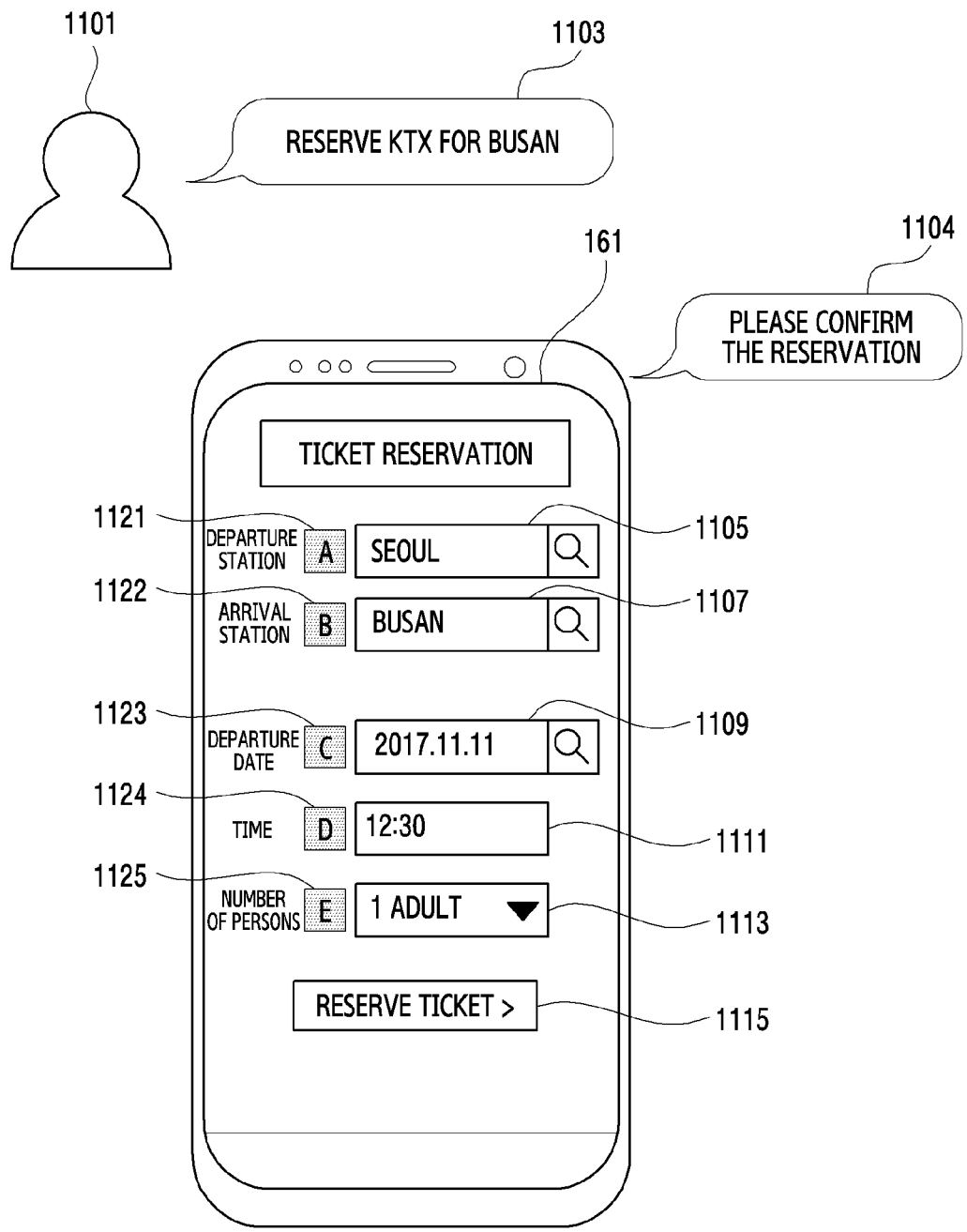

FIG. 10 illustrates a flowchart for displaying an electronic document including guide information for a user's voice command in an electronic device according to various embodiments of the present invention. FIG. 11A through FIG. 11C illustrate exemplary diagrams for displaying an electronic document including guide information for a user's voice command in an electronic device according to various embodiments of the present invention. The electronic device in the following description may include the electronic device 101 of FIG. 1, the electronic device 100 of FIG. 2, the electronic device 100 of FIG. 3, or at least part (e.g., the processor 120) of the electronic device 101.

Referring to FIG. 10 and FIG. 11A, the electronic device 101 (e.g., the processor 120 of FIG. 1) may execute a voice command mode, in operation 1001. For example, the voice command mode may be a mode for receiving and processing user's speech as a voice signal by executing an intelligence app (e.g., a voice recognition app) interworking with the intelligence agent 135 of FIG. 3.

The electronic device 101 (e.g., the processor 120 of FIG. 1) may detect a voice command 1103, in operation 1003. For example, the electronic device 101 may receive the user's speech as a voice signal through the input module 110 of FIG. 3, and detect the voice command 1103 included in the voice signal. For example, as shown in FIG. 11A, the electronic device 101 may detect a voice command (e.g., Reserve KTX for Busan, 1103) of the user 1101.

The electronic device 101 (e.g., the processor 120 of FIG. 1) may determine whether to output an electronic document corresponding to the voice command 1103, in operation 1005. For example, the electronic device 101 may determine whether to output an electronic document (e.g., a web page for KTX reservation) on the display 161 to execute a function (e.g., KTX reservation) corresponding to the voice command 1103 of the user 1101. For example, the electronic document may include a link connected to other electronic document, at least one input field for displaying data, or at least one select field including execution code.

According to an embodiment, if there is no need to output the electronic document corresponding to the voice command 1103, the electronic device 101 may terminate the corresponding procedure or execute a function corresponding to the voice command. For example, if a voice command (e.g., Tell me the meaning of evaluation) of the user 1101 is a function (e.g., outputting English word meaning) not related to the electronic document unlike the drawing, the electronic device 101 may immediately execute the function corresponding to the voice command without outputting the electronic document.

According to an embodiment, if outputting the electronic document corresponding to the voice command 1103, the electronic device 101 (e.g., the processor 120 of FIG. 1) may identify an input field included in the electronic document in operation 1007. For example, the input field may display data corresponding to the user's voice command 1103. For example, while parsing the electronic document, the electronic device 101 may identify information of the input field included in the electronic document. For example, the information of the input field may include a text (e.g., an input field name) or identification information (e.g., input field ID). For example, as shown in FIG. 11A, the electronic document displayed on the display 161 may include a departure station input field 1105, an arrival station input field 1107, a departure date input field 1109, a time input field 1111, and a number of persons input field 1113. As another example, the electronic document may include a select field by which a corresponding function is executed as the field is selected. For example, as shown in FIG. 11A, the electronic document may include a ticket reservation select field 1115.

The electronic device 101 (e.g., the processor 120 of FIG. 1) may determine guide information based on the information of the input field, in operation 1009. For example, the guide information may be information for guiding the user to easily input an additional voice command and may be displayed on an electronic document. For example, the electronic device 101 may determine guide information based on a text corresponding to the input field name. For example, the electronic device 101 may extract part of the text corresponding to the input field name based on a priority, and determine part of the extracted text as the guide information. The priority may include at least one of a letter which may be easily found by the user (e.g., if letters are short and simple), a letter easily pronounced by the user, a letter easily recognized by the electronic device 101, and a letter having meaning which the user may easily recognize. For example, as shown in FIG. 11A, the electronic device 101 may determine the guide information of the departure station input field 1105 to "DEPAR" 1106, determine the guide information of the arrival station input field 1107 to "ARRI" 1108, determine the guide information of the departure date input field 1109 to "DATE" 1110, determine the guide information of the time input field 1111 to "TI" 1112, and determine the guide information of the number of persons input field 1113 to "NUMBER" 1114. For example, the user may easily select the input field by uttering guide information (e.g., DEPAR Suwon). The operation of determining the guide information will be described later in FIG. 14.

The electronic device 101 (e.g., the processor 120 of FIG. 1) may display an electronic document including the guide information, in operation 1011. For example, the electronic device 101 may display data in the input fields 1105 through 1113 of the electronic document on the display 161 based on the information included in the voice command 1103 of the user 1101, and further display guide information. For example, on the display 161 based on the voice command 1103 ("Reserve KTS for Busan"), the electronic device 101 may display "Busan" in the arrival station input field 1107, display "Seoul" in the departure station input field 1105 based on a current location of the user 1101, display "current date (2017.11.11)" in the departure date input field 1109, and "current time (12:30)" in the time input field 1111, and display "1 adult" in the number of persons input field 1113 based on the use history of the user 1101. As another example, on the display 161 based on the determined guide information, the electronic device 101 may display guide information including "DEPAR" 1106, guide information including "ARRI" 1108, guide information including "DATE" 1110, guide information including "TI" 1112, and/or guide information including "NUMBER" 1114. For example, the user may easily input an additional voice command based on the displayed guide information. For example, the user's additional voice command may include the guide information and the data (e.g., DEPAR Suwon).

According to an embodiment, the electronic device 101 may add a graphic effect so that the guide information may be more easily recognized by the user. For example, the electronic device 101 may additionally display a rectangular figure surrounding the guide information and a shading effect filling the figure on the display 161 as shown in FIG. 11. As another example, the electronic device 101 may change a font (style) of the letter extracted with the guide information or change a background color of the letter.

According to an embodiment, the electronic device 101 may apply a graphic effect to the guide information so that the user may easily obtain an operation (e.g., changing data of a reservation related input field) which may be currently performed by the user.

According to an embodiment, the electronic device 101 may determine the name of the input field as the guide information. For example, as shown in FIG. 11B, the electronic device 101 may determine "departure station" 1116 corresponding to the name of the departure station input field 1105 as the guide information. Besides, the electronic device 101 may determine "arrival station" 1117, "departure date" 1118, "time" 1119, and "number of persons" 1120 as the guide information of the corresponding input fields 1107, 1109, 1111, and 1113.

According to an embodiment, the electronic device 101 may determine a text not related to the input field as the guide information. For example, as shown in FIG. 11C, the electronic device 101 may determine "A" 1121 as guide information of the departure station input field 1105, determine "B" 1122 as guide information of the arrival station input field 1107, determine "C" 1123 as guide information of the departure date input field 1109, determine "D" 1124 as guide information of the time input field 1111, and determine "E" 1125 as guide information of the number of persons input field 1113.

The electronic device 101 may display the electronic document including the guide information and then output a message 1104 (e.g., Confirm the reservation) requesting the user 1101 to identify reservation information. As another example, the electronic device 101 may display a message requesting to identify the reservation information on the display 161. Next, the electronic device 101 may display a next electronic document (e.g., a payment web page) for the reservation if receiving an input for requesting a ticket reservation from the user.

Figure 12:
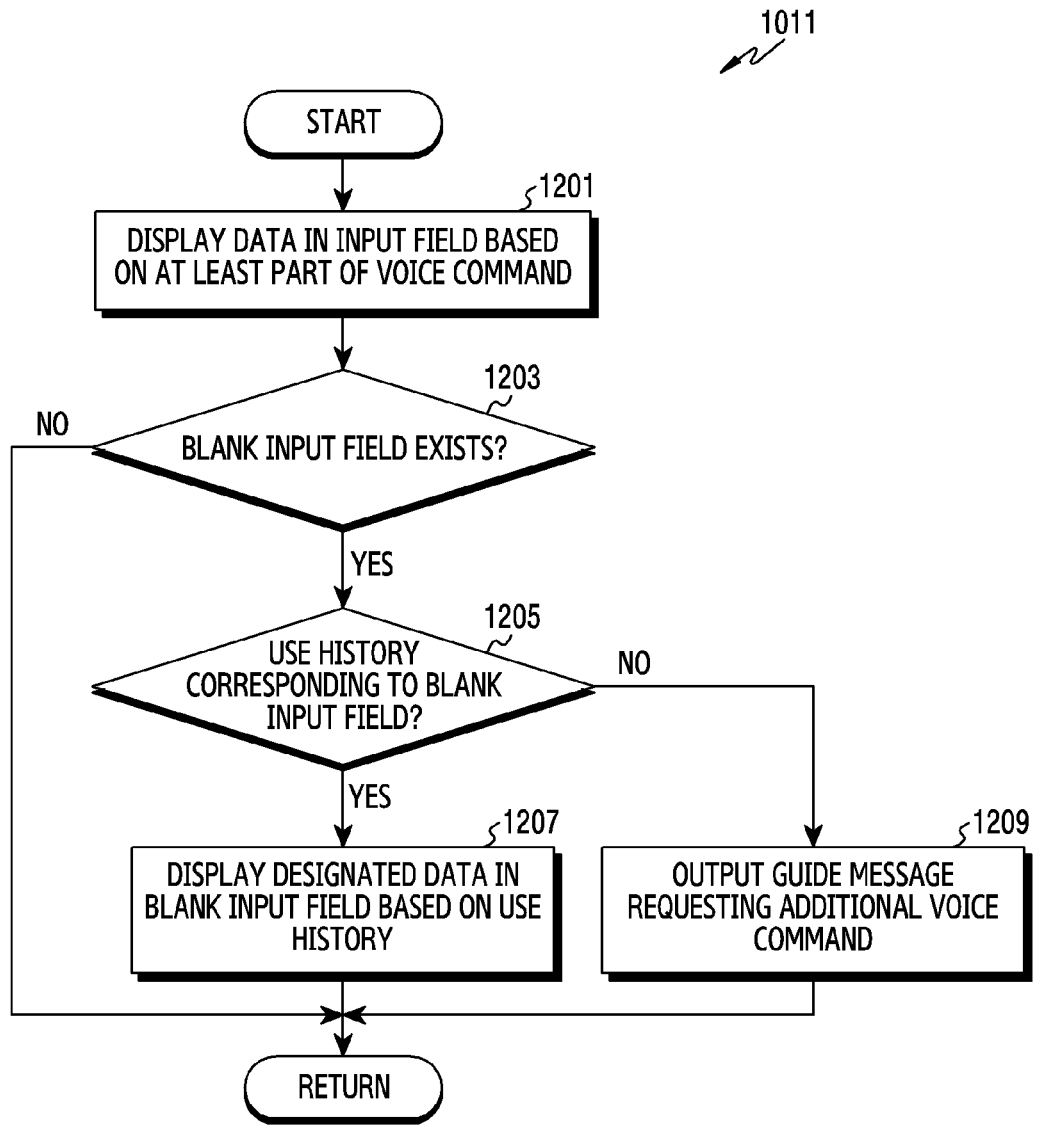
FIG. 12 illustrates a flowchart for displaying data designated in an input field based on a use history in an electronic device according to various embodiments of the present invention.
Figure 13:
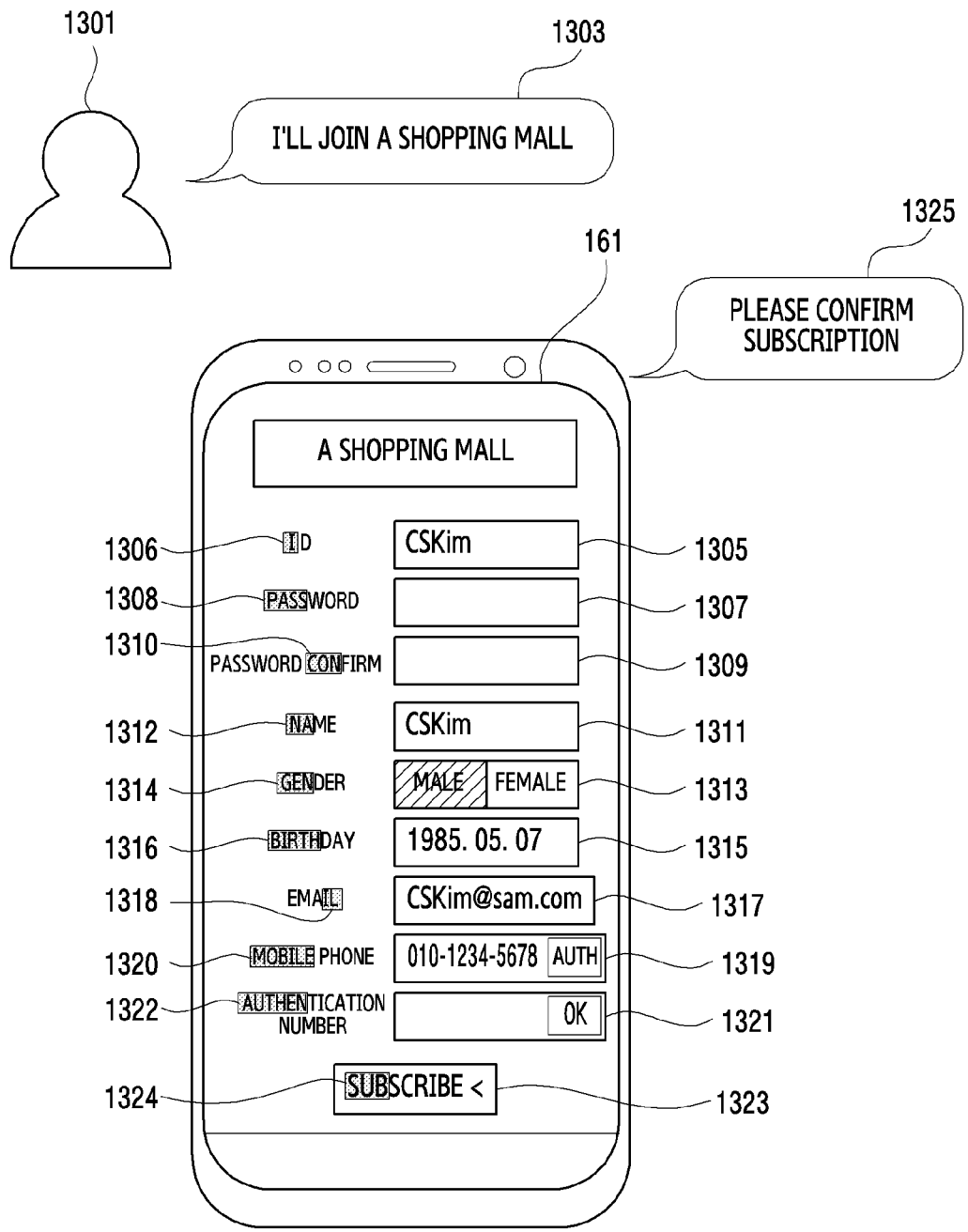
FIG. 13 illustrates an exemplary diagram for displaying data designated in an input field based on a use history in an electronic device according to various embodiments of the present invention.

FIG. 12 illustrates a flowchart for displaying data designated in an input field based on a use history in an electronic device according to various embodiments of the present invention. FIG. 13 illustrates an exemplary diagram for displaying data designated in an input field based on a use history in an electronic device according to various embodiments of the present invention. The electronic device in the following description may include the electronic device 101 of FIG. 1, the electronic device 100 of FIG. 2, the electronic device 100 of FIG. 3, or at least a part (e.g., the processor 120) of the electronic device 101.

The following description explains an operation of displaying data in the input field in operation 1011 of FIG. 10.

Referring to FIG. 12, the electronic device 101 (e.g., the processor 120 of FIG. 1) may display data in the input field based on at least a part of a voice command 1303, in operation 1201. For example, as shown in FIG. 11, the electronic device 101 may display "Busan" in the arrival station input field 1107 on the display 161 based on the voice command 1103 of the user 1101.

The electronic device 101 (e.g., the processor 120 of FIG. 1) may determine whether there is a blank input field, in operation 1203. For example, the electronic device 101 may determine whether data corresponding to an ID input field 1305, a password input field 1307, a password confirm input field 1309, a name input field 1311, a gender input field 1313, a birthday input field 1315, an email input field 1317, a mobile phone input field 1319, and an authentication number input field 1321 are present in the voice command 1303 of the user 1301 as shown in FIG. 13. For example, the blank input field may be an input field having no data to display because data corresponding to the input field is not included in the voice command 1303 of the user 1301. Since the voice command 1303 of the user 1301 does not include data corresponding to the plurality of the input fields 1305 through 1321 as shown in FIG. 13, the electronic device 101 may determine that the blank input field exists.

According to an embodiment, if determining that there is no blank input field, the electronic device 101 (e.g., the processor 120 of FIG. 1) may return to display an electronic document including guide information. For example, unlike FIG. 13, if specific user information (e.g., an ID, a name, etc.) is included in the voice command 1303 of the user 1301, the electronic device 101 may display data in the respective input fields on the display 161.

According to an embodiment, if determining that the blank input field exists, the electronic device 101 (e.g., the processor 120 of FIG. 1) may determine whether there is a use history corresponding to the blank input field in operation 1205. For example, the use history may include an ID frequently used by the user 1301, a name (nickname), an email address, a train route frequently used, and the number of train companions, and may further include a user's personal history (e.g., a gender, a mobile phone number).

According to an embodiment, if there is no use history corresponding to the blank input field, the electronic device 101 (e.g., the processor 120 of FIG. 1) may output a guide message for requesting an additional voice command in operation 1209. For example, the electronic device 101 may output the guide message requesting information of the user 1301 through the speaker 156 of FIG. 3 or may display the guide message through the display 161.

According to an embodiment, if there is the use history corresponding to the blank input field, the electronic device 101 (e.g., the processor 120 of FIG. 1) may display designated data in the input field based on the use history in operation 1207. For example, as shown in FIG. 11, the electronic device 101 may display data in the departure station input field 1105 and the number of persons input field 1113 based on the use history (e.g., a train route frequently used, the number of train companions) on the display 161. As another example, as shown in FIG. 13, the electronic device 101 may display data in the ID input field 1305, the name input field 1311, the gender input field 1313, the birthday input field 1315, the email input field 1317, and the mobile phone input field 1319 based on the use history (e.g., the frequently used ID, the name, the gender, the birthday, the email address, or the mobile phone number) on the display 16.

The electronic device 101 (e.g., the processor 120 of FIG. 1) may return after operation 1207 and display an electronic document including the guide information. For example, the electronic device 101 may further display guide information "I" 1306 corresponding to the ID input field 1305, guide information "PASS" 1308 corresponding to the password input field 1307, guide information "CON" 1310 corresponding to the password confirm input field 1309, guide information "NA" 1312 corresponding to the name input field 1311, guide information "GEN" 1314 corresponding to the gender input field 1313, guide information "BIRTH" 1316 corresponding to the birthday input field 1315, guide information "IL" 1318 corresponding to the email input field 1317, guide information "MOBILE" 1320 corresponding to the mobile phone input field 1319, and guide information "AUTHEN" 1322 corresponding to the authentication number input field 1321 on the display 161.

Figure 14:
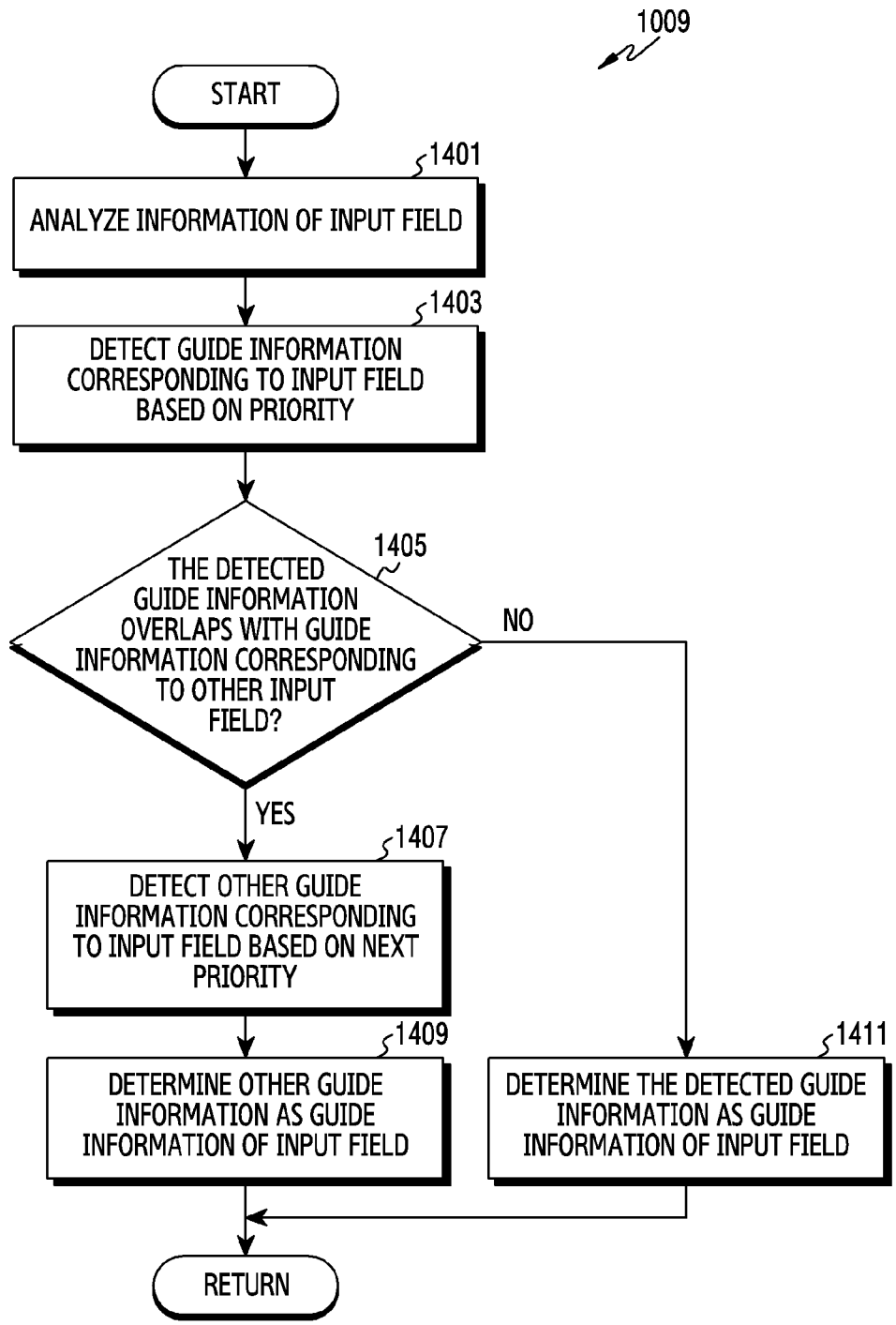
FIG. 14 illustrates a flowchart for determining guide information in an electronic device according to various embodiments of the present invention.

FIG. 14 illustrates a flowchart for determining guide information in an electronic device according to various embodiments of the present invention. The electronic device in the following description may include the electronic device 101 of FIG. 1, the electronic device 100 of FIG. 2, the electronic device 100 of FIG. 3, or at least a part (e.g., the processor 120) of the electronic device 101.

The following description explains an operation of determining guide information in operation 1009 of FIG. 10.

Referring to FIG. 14, the electronic device 101 (e.g., the processor 120 of FIG. 1) may analyze information of an input field, in operation 1401. For example, the information of the input field may include a text (e.g., an input field name) or identification information (e.g., an input field ID). For example, by analyzing the input field information, the electronic device 101 may identify a text corresponding to a name of the input field.

The electronic device 101 (e.g., the processor 120 of FIG. 1) may detect guide information corresponding to the input field based on a priority, in operation 1403. For example, the electronic device 101 may detect the guide information based on the text corresponding to the input field name. For example, the electronic device 101 may extract a part of the text corresponding to the input field name based on the priority, and detect part of the extracted text as the guide information. For example, the priority may include at least one of a letter which the user may easily find, a letter easily pronounced by the user, a letter easily recognized by the electronic device 101, and a letter having a meaning that the user may easily recognize. For example, as shown in FIG. 11, the electronic device 101 may detect "DEPAR" 1106 in the guide information of the departure station input field 1105, detect "ARRI" 1108 in the guide information of the arrival station input field 1107, detect "DATE" 1110 in the guide information of the departure date input field 1109, detect "TI" 1112 in the guide information of the time input field 1111, and detect "NUMBER" 1114 in the guide information of the number of persons input field 1113.

In operation 1405, the electronic device 101 (e.g., the processor 120 of FIG. 1) may identify whether the detected guide information overlaps with the guide information corresponding to other input field. For example, the electronic device 101 may detect "DEPAR" in the departure date input field 1109 as the guide information, and determine that the detected guide information is identical to "DEPAR" 1106 corresponding to the guide information of the departure station input field 1105.

According to an embodiment, if determining that the detected guide information does not overlap with the guide information corresponding to other input field, the electronic device 101 (e.g., the processor 120 of FIG. 1) may determine the detected guide information as guide information of the input field in operation 1411.

According to an embodiment, if determining that the detected guide information overlaps with the guide information corresponding to other input field, the electronic device 101 (e.g., the processor 120 of FIG. 1) may detect other guide information corresponding to the input field based on a next priority in operation 1407. For example, if "DEPAR" 1106 corresponding to the guide information in the departure station input field 1105 and "DEPAR" corresponding to the guide information detected in the departure date input field 1109 overlap, the electronic device 101 may detect "DATE" 1110 which is the letter easily recognized next to "DEPAR" by the user 1101 as other guide information.

In operation 1409, the electronic device 101 (e.g., the processor 120 of FIG. 1) may determine the other guide information as the guide information of the input field. For example, the electronic device 101 may determine the guide information of the departure date input field 1109 to "DATE" 1110.

The electronic device 101 (e.g., the processor 120 of FIG. 1) may return after completing operation 1409 or operation 1411 and display an electronic document including the guide information.

Figure 15:
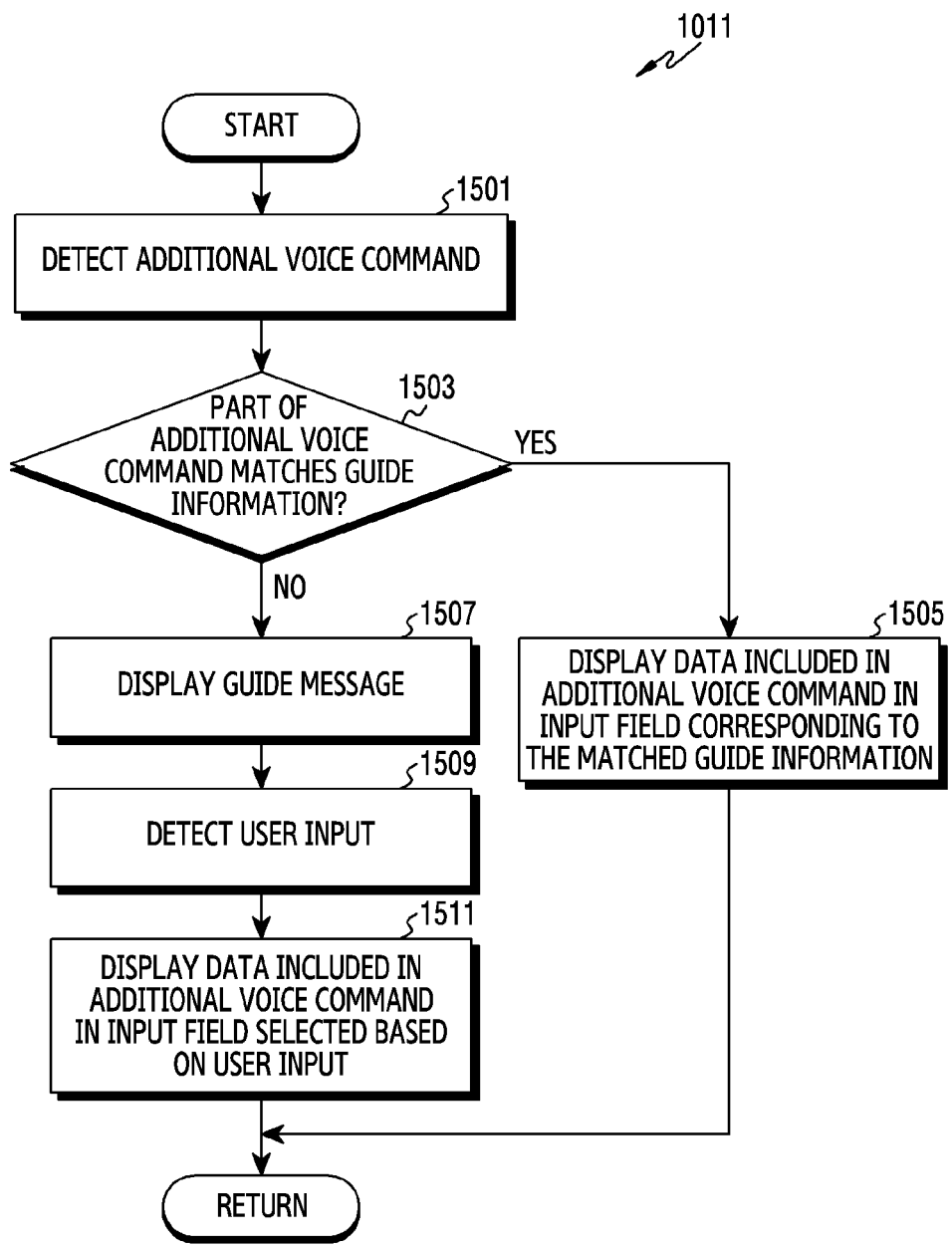
FIG. 15 illustrates a flowchart for displaying data corresponding to a user's additional voice command in an input field in an electronic device according to various embodiments of the present invention.
Figure 16:
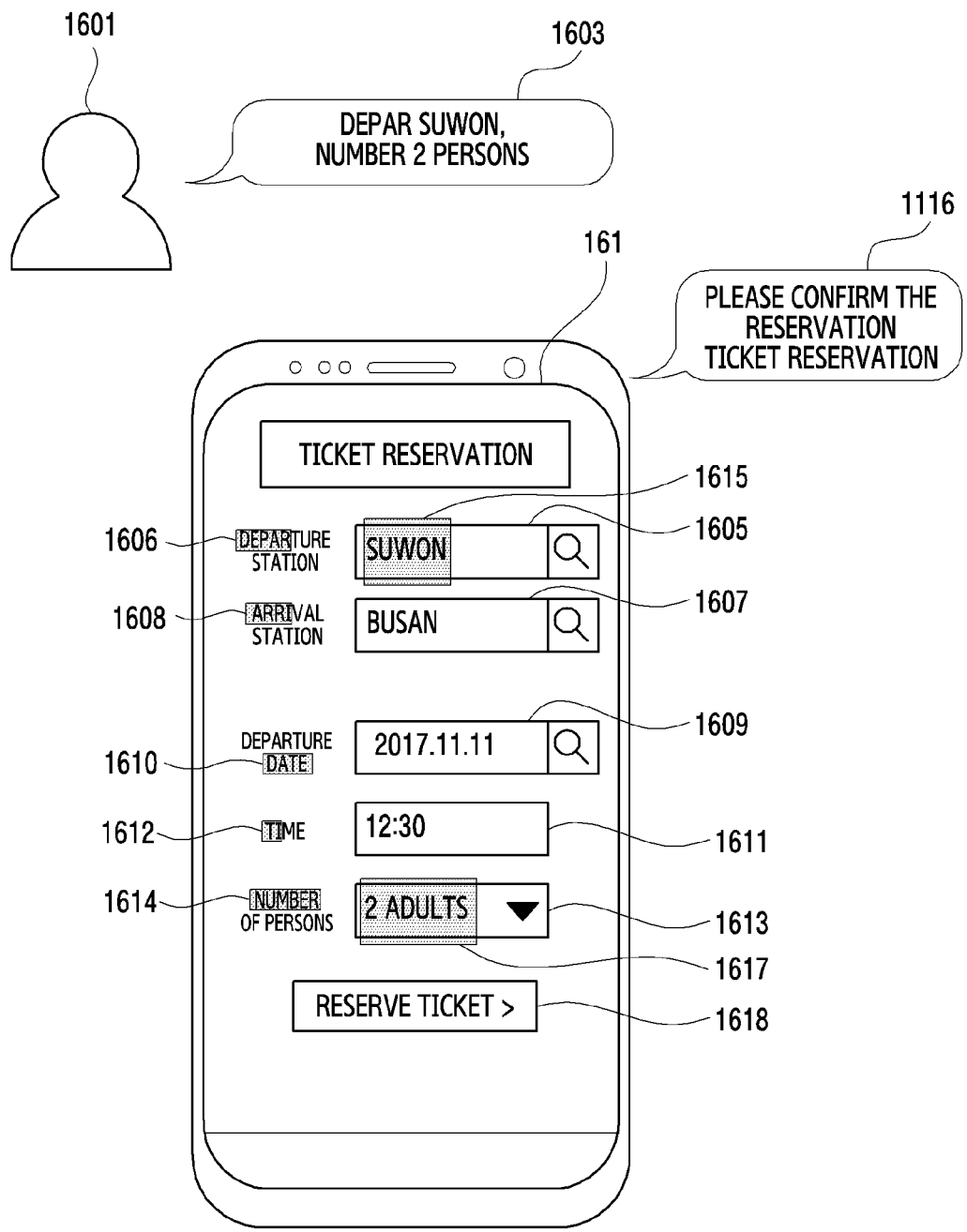
FIG. 16 illustrates an exemplary diagram for displaying data corresponding to a user's additional voice command in an input field in an electronic device according to various embodiments of the present invention.
Figure 17:
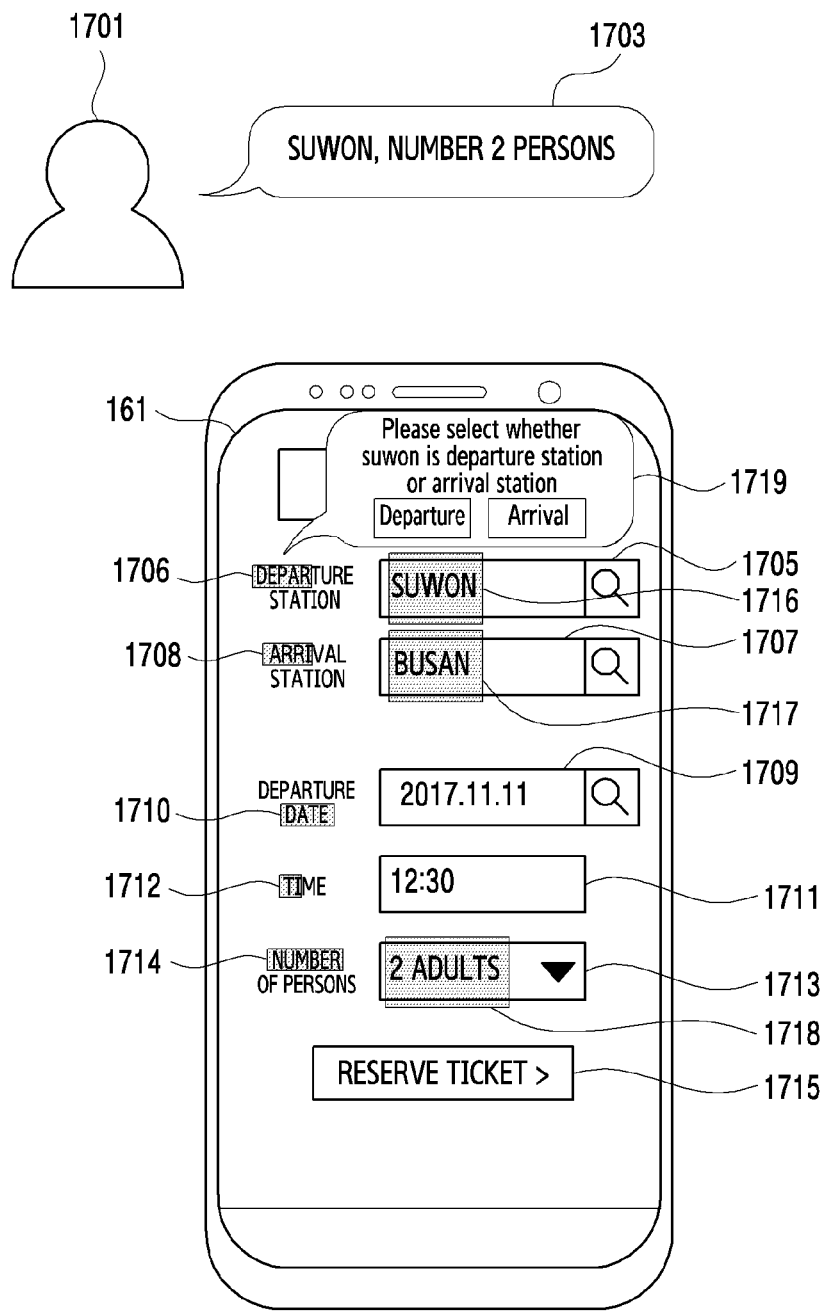
FIG. 17 illustrates an exemplary diagram for displaying a guide message for recognizing a user's additional voice command in an electronic device according to various embodiments of the present invention.

FIG. 15 illustrates a flowchart for displaying data corresponding to a user's additional voice command in an input field in an electronic device according to various embodiments of the present invention. FIG. 16 illustrates an exemplary diagram for displaying data corresponding to a user's additional voice command in an input field in an electronic device according to various embodiments of the present invention. FIG. 17 illustrates an exemplary diagram for displaying a guide message for recognizing a user's additional voice command in an electronic device according to various embodiments of the present invention. The electronic device in the following description may include the electronic device 101 of FIG. 1, the electronic device 100 of FIG. 2, the electronic device 100 of FIG. 3, or at least part (e.g., the processor 120) of the electronic device 101.

The following description explains an operation of displaying data in an input field based on an additional voice command in operation 1011 of FIG. 10.

Referring to FIG. 15, the electronic device 101 (e.g., the processor 120 of FIG. 1) may detect an additional voice command, in operation 1501. For example, as shown in FIG. 16, the electronic device 101 may detect an additional voice command 1603 of a user 1601 through the input module 110 of FIG. 3. For example, the additional voice command 1603 may be "DEPAR Suwon, NUMBER 2 persons". As another example, as shown in FIG. 17, the electronic device 101 may detect an additional voice command 1703 of a user 1701 through the input module 110. For example, the additional voice command 1703 may be "Suwon, NUMBER 2 persons".

In operation 1503, the electronic device 101 (e.g., the processor 120 of FIG. 1) may identify whether part of the additional voice command matches guide information. For example, the electronic device 101 may identify whether at least part of the data included in the voice command 1603 of the user 1601 matches part of a plurality of guide information. For example, as shown in FIG. 16 and FIG. 17, the electronic device 101 may compare guide information corresponding to departure station input field 1605 and guide information corresponding to departure statin input field 1705. the electronic device 101 may compare guide information corresponding to arrival station input field 1607 and guide information corresponding to arrival station input field 1707. the electronic device 101 may compare guide information corresponding to departure date input field 1609 and guide information corresponding to departure date input field 1709. the electronic device 101 may compare guide information corresponding to time input field 1611 and guide information corresponding to time input filed 1711. the electronic device 101 may compare guide information corresponding to number of persons input field 1613 and guide information corresponding to number of persons input field 1713 with data included in the additional voice commands 1603 and 1703.

According to an embodiment, if part of the additional voice command matches the guide information, the electronic device 101 (e.g., the processor 120 of FIG. 1) may display data in the input field corresponding to the matched guide information in operation 1505. For example, "DEPAR" and "NUMBER" which are part of the additional voice command 1603 match the guide information including "DEPAR" 1606 and the guide information including "NUMBER" 1614 respectively, the electronic device 101 may display data (e.g., Suwon) in the departure station input field 1605 on the display 161, and display data (e.g., 2 adults) in the number of persons input field 1613. As another example, the electronic device 101 may add graphic effects 1615 and 1617 (e.g., rectangles) so that the user may easily recognize the displayed data according to the additional voice command 1603.

According to an embodiment, if part of the additional voice command does not match the guide information, the electronic device 101 (e.g., the processor 120 of FIG. 1) may display a guide message in operation 1507. For example, if there is no guide information matching the data (e.g., Suwon) included in the additional voice command 1703, the electronic device 101 may display a guide message 1719 requesting to select an input field corresponding to the data (e.g., Suwon) included in the additional voice command 1703 on the display 161. As another example, the electronic device 101 may output the guide message 1719 through the speaker 156 of FIG. 3.

The electronic device 101 (e.g., the processor 120 of FIG. 1) may detect a user input, in operation 1509. For example, the electronic device 101 may detect a user's selection that the data (e.g., Suwon) included in the additional voice command 1703 corresponds to the departure station input field 1705.

The electronic device 101 (e.g., the processor 120 of FIG. 1) may display data in an input field selected based on the user input, in operation 1511. For example, the electronic device 101 may display the data (e.g., Suwon) included in the additional voice command 1703 in the departure station input field 1705.

The electronic device 101 (e.g., the processor 120 of FIG. 1) may return after completing operation 1511 or operation 1505 and display an electronic document including the guide information.

Figure 18:
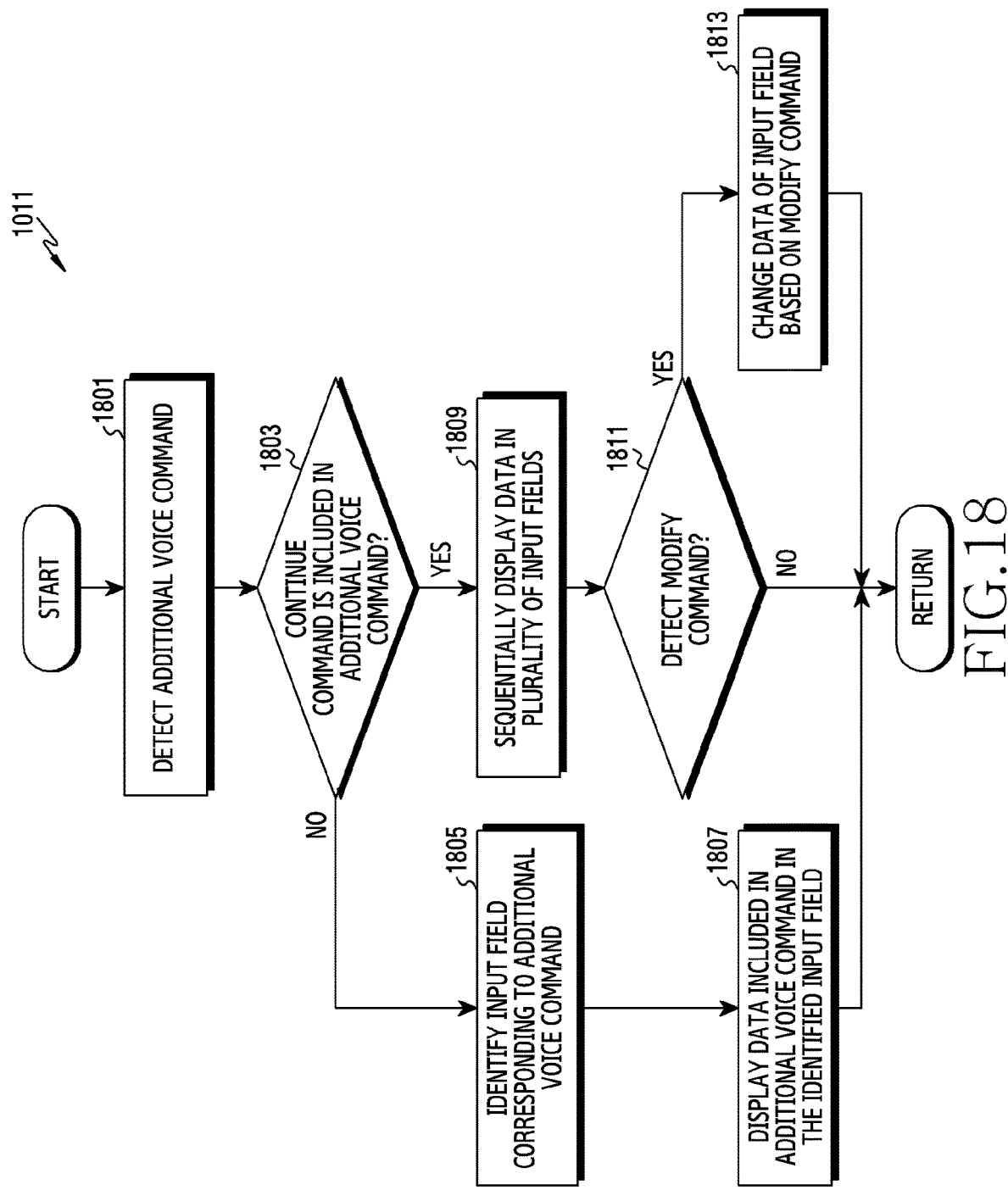
FIG. 18 illustrates a flowchart for processing an additional voice command including a continue command in an electronic device according to various embodiments of the present invention.
Figure 19:
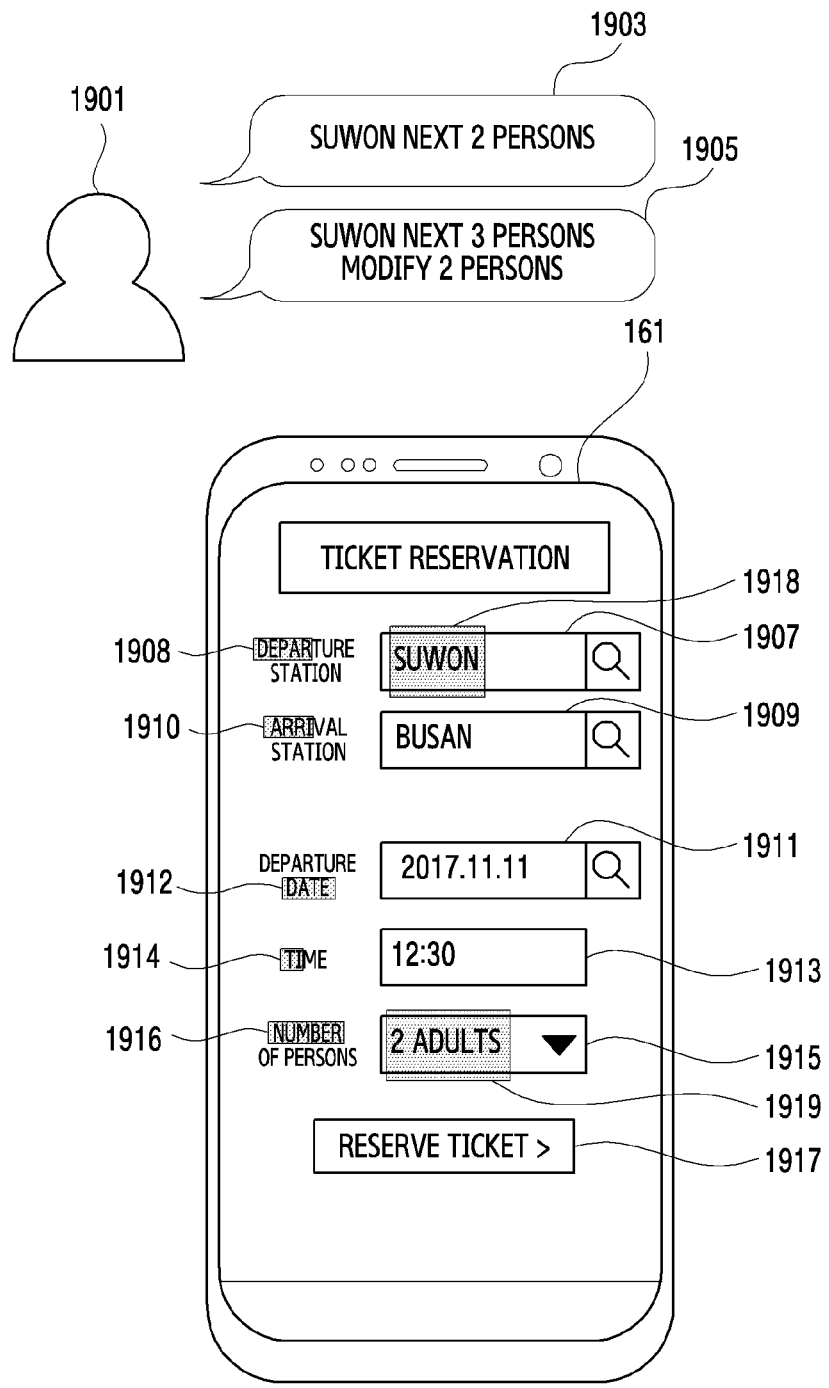
FIG. 19 illustrates an exemplary diagram for processing an additional voice command including a continue command in an electronic device according to various embodiments of the present invention.

FIG. 18 illustrates a flowchart for processing an additional voice command including a continue command in an electronic device according to various embodiments of the present invention. FIG. 19 illustrates an exemplary diagram for processing an additional voice command including a continue command in an electronic device according to various embodiments of the present invention. The electronic device in the following description may include the electronic device 101 of FIG. 1, the electronic device 100 of FIG. 2, the electronic device 100 of FIG. 3, or at least part (e.g., the processor 120) of the electronic device 101.

The following description explains an operation of displaying an electronic document based on an additional voice command in operation 1011 of FIG. 10.

Referring to FIG. 18, the electronic device 101 (e.g., the processor 120 of FIG. 1) may detect an additional voice command, in operation 1801. For example, as shown in FIG. 19, the electronic device 101 may detect an additional voice command 1903 (Suwon next 2 persons) or an additional voice command 1905 (Suwon next 3 persons modify 2 persons) of the user 1901.

The electronic device 101 (e.g., the processor 120 of FIG. 1) may determine whether a continue command is included in the additional voice command, in operation 1803. For example, the continue command may be a command for sequentially displaying data included in the voice command in a plurality of input fields. For example, the electronic device 101 may determine whether the additional voice commands 1903 and 1905 include "next" corresponding to the continue command. For example, "next" corresponds to an example, and the continue command may be formed in different letters.

According to an embodiment, the electronic device 101 may display data in a next input field on the display 161 if detecting a silence section exceeding a designated time in the user's voice command. For example, if the user inputs a voice command (e.g., "Suwon silence 2017.11.11"), the electronic device 101 detecting the silence section may skip the arrival station input field 1909 and and display data in the departure date input field 1911 on the display 161.

According to an embodiment, the continue command may be activated if a plurality of input fields allowing data input is sequentially displayed. For example, if a plurality of input fields 1907, 1909, 1911, 1913, and 1915 is sequentially displayed from top to bottom of a display area of the display 161 as shown in FIG. 19, the continue command may be activated. For example, if detecting the continue command, the electronic device 101 may display data (e.g., next "2 persons") following the continue command based on the order displayed on the display 161 in the corresponding input field on the display 161.

According to an embodiment, if the continue command is not included in the additional voice command, the electronic device 101 (e.g., the processor 120 of FIG. 1) may identify an input field corresponding to the additional voice command in operation 1805, and display the data in the identified input field in operation 1807.

According to an embodiment, if the continue command is included in the additional voice command, the electronic device 101 (e.g., the processor 120 of FIG. 1) may sequentially display data in a plurality of input fields in operation 1809. For example, if the data included in an additional voice command 1902 of a user 1901 is "Suwon next 2 persons", the electronic device 101 may display "Suwon" in the departure station input field 1907 disposed at the top on the display 161, and display "2 adults" in the number of persons input field 1915 corresponding to the data format of "2 persons". Although not depicted in the drawing, if the data included in the additional voice command is "Suwon next Busan 12:30", the electronic device 101 may display "Suwon in the departure station input field 1907 which is the input field disposed at the top, display "Busan" in the arrival station input field 1909 which is the input field disposed next to the top, and display "12:30" in the time input field 1913 corresponding to the data format of "12:30".

The electronic device 101 (e.g., the processor 120 of FIG. 1) may identify whether a modify command is detected, in operation 1811. For example, the modify command may be a command for changing part of data included in the voice command. For example, the electronic device 101 may detect "modify" corresponding to the modify command in the additional voice command 1905.

According to an embodiment, if not detecting the modify command, the electronic device 101 (e.g., the processor 120 of FIG. 1) may return to display an electronic document including guide information.

According to an embodiment, if detecting the modify command, the electronic device 101 (e.g., the processor 120 of FIG. 1) may change the data of the input field based on the modify command in operation 1813. For example, if displaying "3 adults" in the number of persons input field 1915 and then detecting "modify 2 persons", the electronic device 101 may display "2 adults" in the number of persons input field 1915 on the display 161.

Figure 20:
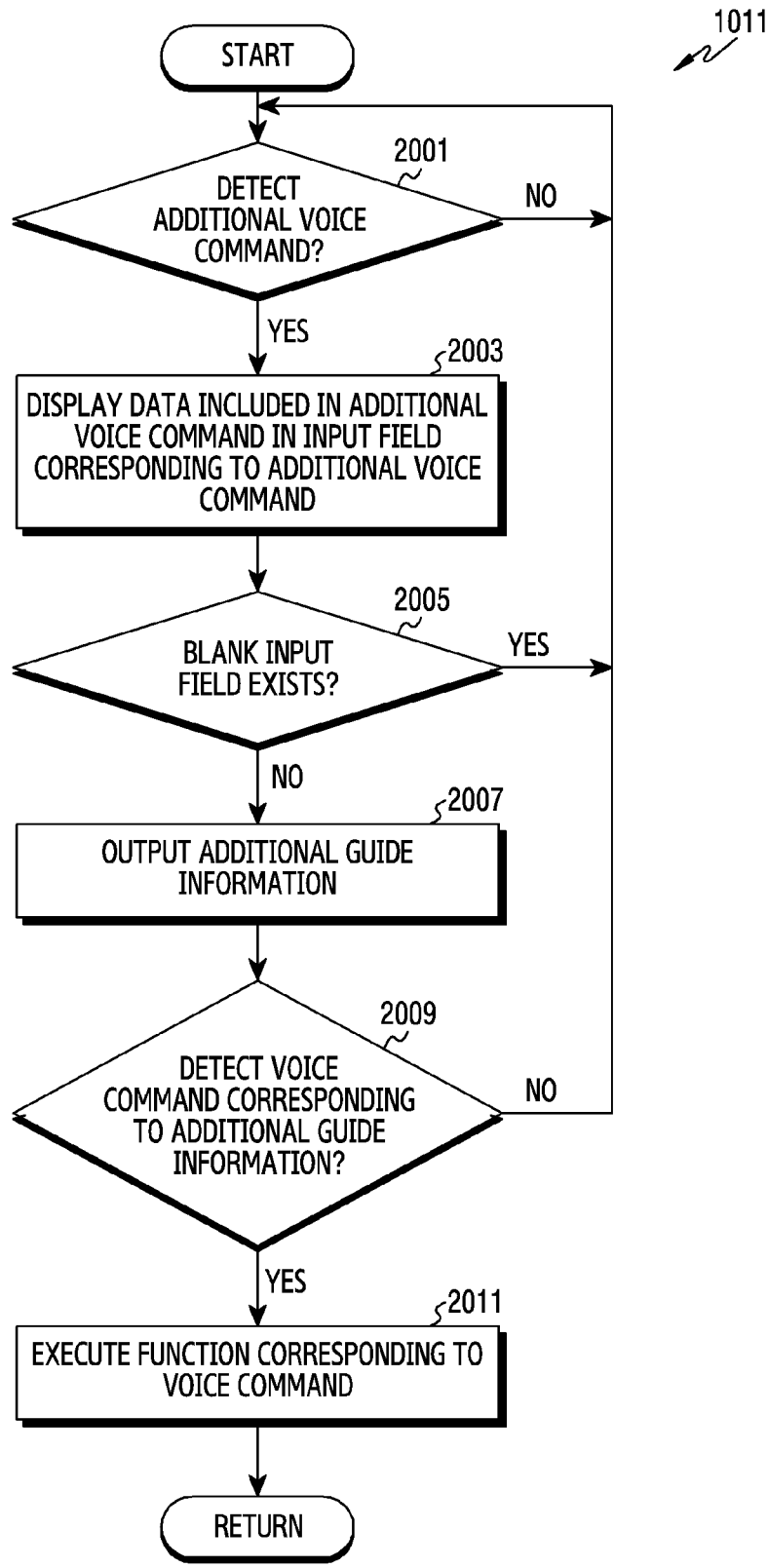
FIG. 20 illustrates a flowchart for outputting additional guide information in an electronic device according to various embodiments of the present invention.
Figure 21:
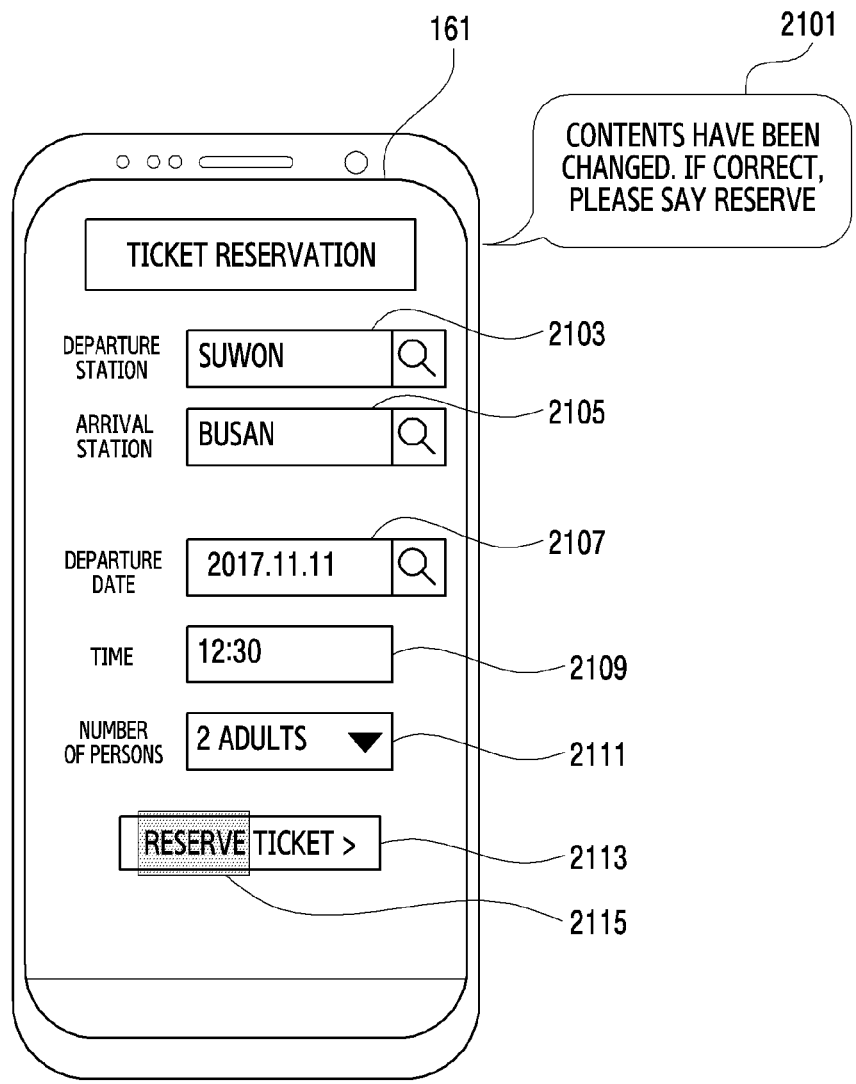
FIG. 21 illustrates an exemplary diagram for outputting additional guide information in an electronic device according to various embodiments of the present invention.

FIG. 20 illustrates a flowchart for outputting additional guide information in an electronic device according to various embodiments of the present invention. FIG. 21 illustrates an exemplary diagram for outputting additional guide information in an electronic device according to various embodiments of the present invention. The electronic device in the following description may include the electronic device 101 of FIG. 1, the electronic device 100 of FIG. 2, the electronic device 100 of FIG. 3, or at least part (e.g., the processor 120) of the electronic device 101.

The following description explains an operation of outputting additional guide information in operation 1011 of FIG. 10.

Referring to FIG. 20, the electronic device 101 (e.g., the processor 120 of FIG. 1) may identify whether an additional voice command is detected, in operation 2001. According to an embodiment, if not detecting the additional voice command, the electronic device 101 may continuously or periodically identify whether the additional voice command is detected. According to an embodiment, if detecting the additional voice command, the electronic device 101 (e.g., the processor 120 of FIG. 1) may display data in an input field corresponding to the additional voice command, in operation 2003. For example, as shown in FIG. 21, the electronic device 101 may display "Suwon" in a departure station input field 2103 on the display 161, display "Busan" in an arrival station input field 2105, display "2017.11.11" in a departure date input field 2107, display "12:30" in a time input field 2109, and display "2 adults" in a number of persons input field 2111.

The electronic device 101 (e.g., the processor 120 of FIG. 1) may determine whether a blank input field exists in operation 2005. If there is the blank input field, the electronic device 101 may identify whether an additional voice command is detected or may output a message requesting to input data corresponding to the blank input field.

According to an embodiment, the electronic device 101 may output additional guide information in operation 2007 even if there is the blank input field. For example, if the blank input field is not an essential element in executing a function (e.g., subscription) corresponding to a voice command (e.g., if an input field for inputting whether the user is married is blank in an electronic document for subscription), the electronic device 101 may output additional guide information.

According to an embodiment, if there is no blank input field, the electronic device 101 (e.g., the processor 120 of FIG. 1) may output additional guide information in operation 2007. For example, as shown in FIG. 21, the electronic device 101 may display additional guide information 2115 in a ticket reservation select field on the display 161. For example, the ticket reservation select field may be a field linked to a reservation related function (e.g., payment). As another example, the electronic device 101 may output an additional guide message 2101 (e.g., Contents have been changed. If correct, please say Reserve) through the speaker 156 of FIG. 3.

The electronic device 101 (e.g., the processor 120 of FIG. 1) may identify whether a voice command corresponding to the additional guide information 2115 is detected in operation 2009. For example, the electronic device 101 may detect a user's voice command (e.g., "Reserve") through the input module 110 of FIG. 3.

According to an embodiment, if not detecting the voice command corresponding to the additional guide information 2115, the electronic device 101 (e.g., the processor 120 of FIG. 1) may continuously or periodically identify whether the voice command is detected, and re-output the additional guide message 2101.

According to an embodiment, if detecting the voice command corresponding to the additional guide information 2115, the electronic device 101 (e.g., the processor 120 of FIG. 1) may execute a function corresponding to the voice command in operation 2011. For example, if receiving a voice command (e.g., "Reserve") for the user to select the ticket reservation field 2113, the electronic device 101 may output a payment page for the ticket reservation on the display 161.

Figure 22:
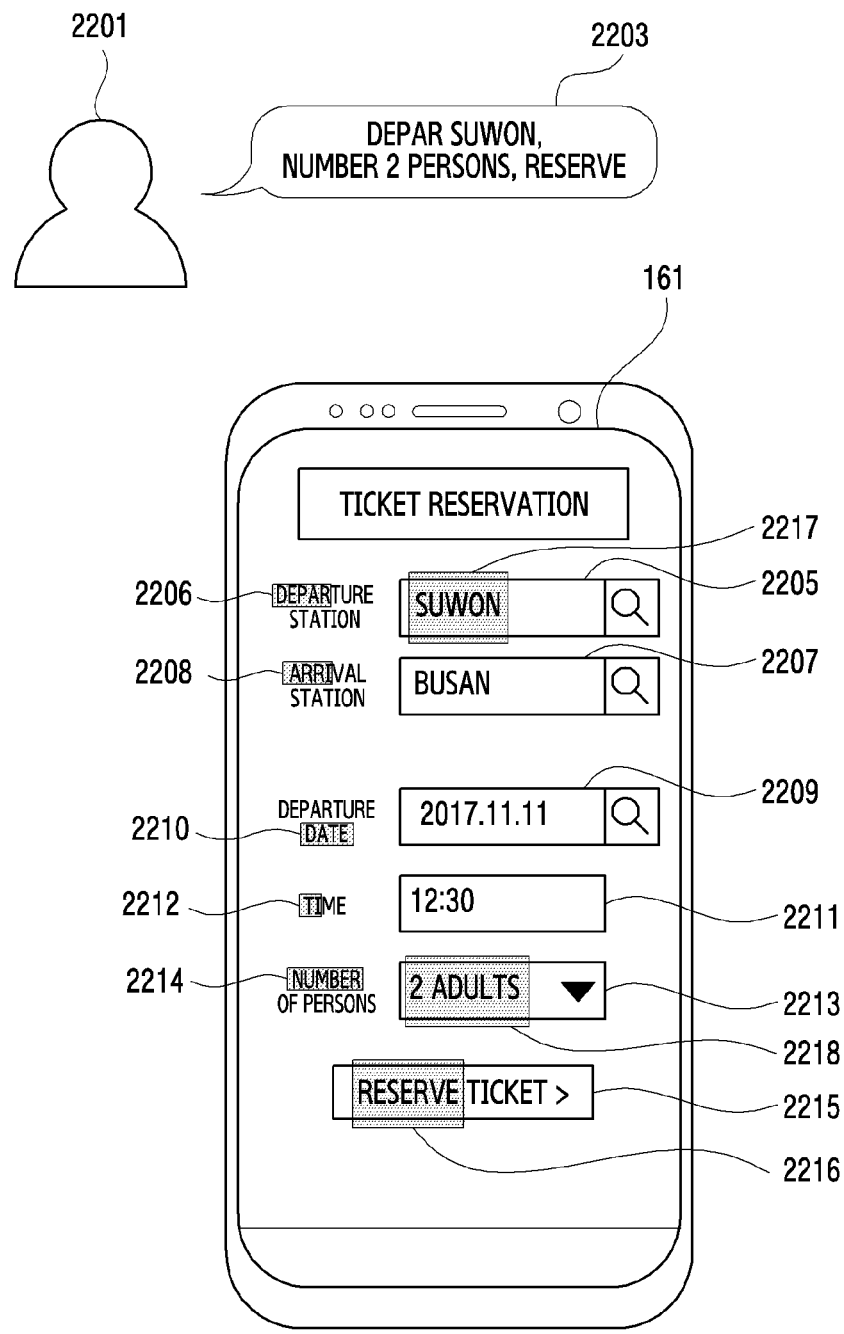
FIG. 22 illustrates an exemplary diagram for processing a user's voice command in an electronic document including guide information corresponding to a select field in an electronic device according to various embodiments of the present invention.

FIG. 22 illustrates an exemplary diagram for processing a user's voice command in an electronic document including guide information corresponding to a select field in an electronic device according to various embodiments of the present invention. In the following description, the electronic device may include the electronic device 101 of FIG. 1, the electronic device 100 of FIG. 2, the electronic device 100 of FIG. 3, or at least part (e.g., the processor 120) of the electronic device 101. The following description explains an operation of displaying guide information in operation 1011 of FIG. 10.

Referring to FIG. 22, unlike FIG. 11, the electronic device 101 may display a plurality of guide information "DEPAR" 2206, "ARRI" 2208, "DATE" 2210, "TI" 2212, "NUMBER" 2214 respectively corresponding to the input fields 2205, 2207, 2209, 2211, and 2213, or additional guide information including "RESERVE" 2216 corresponding to a ticket reservation select field 2215 on the display 161. For example, the electronic device 101 may detect an additional voice command 2203 (e.g., DEPAR Suwon, NUMBER 2 persons, reserve) of a user 2201 through the input module 110 of FIG. 3, change data (e.g., Suwon) of a departure station input field 2205 and data (e.g., 2 adults) of a number of persons input field 2213, and then execute a function corresponding to a ticket reservation select field 2215. For example, the electronic device 101 may display a payment web page on the display 161. As another example, the electronic device 101 may apply graphic effects 2217 and 2218 to "Suwon" and "2 adults" corresponding to the changed data using the display 161 so that the user 2201 may easily obtain the data change.

According to various embodiment of the invention, an operating method of an electronic device (e.g., the electronic device 101 of FIG. 1) may include detecting a voice command (e.g., the voice command 1103 of FIG. 11A) of a user, if outputting an electronic document corresponding to the voice command, identifying at least one input field (e.g., the departure station input field 1105 of FIG. 11A) in the electronic document, determining guide information based on information of the at least one input field (e.g., the guide information 1106 of FIG. 11A), and displaying the electronic document including the guide information.

According to various embodiments, displaying the electronic document may include displaying data in the at least one input field based on at least part of the voice command, and if there is a blank input field in the at least one input field (e.g., the password input field 1309 of FIG. 13), displaying designated data in the blank input field based on a use history.

According to various embodiments, the information of the input field may include texts or identification information related to the at least one input field.

According to various embodiments, determining guide information may include extracting part of the texts related to the at least one input field based on a priority, and determining the extract part as the guide information.

According to various embodiments, determining guide information may include extracting guide information corresponding to any one input field of the at least one input field based on a priority, and if the detected guide information overlaps with guide information corresponding to other input field of the at least one input field, extracting other guide information corresponding to the any one input field based on a next priority.

According to various embodiments, the method may further include extracting an additional voice command of the user using the input device, if part of the additional voice command matches the guide information, displaying data in an input field corresponding to the matched guide information, and if the part of the additional voice command does not match the guide information, displaying a guide message.

According to various embodiments, the method may include applying a graphic effect to the guide information such that the guide information is highlighted relative to at least one object in the electronic document.

According to various embodiments, the method may further include detecting an additional voice command of the user, and if the additional voice command contains a continue command, sequentially displaying data contained the additional voice command in the at least one input field based on the continue command.

According to various embodiments, the method may further include detecting an additional voice command of the user, and if detecting a modify command in the additional voice command, changing data displayed in the at least one input field based on the modify command.

According to various embodiments, the method may further include detecting an additional voice command of the user, displaying data contained the additional voice command in the at least one input field corresponding to the additional voice command, if there is no blank input field in the at least one input field, outputting additional guide information, detecting a voice command corresponding to the additional guide information, and executing a function corresponding to the voice command corresponding to the additional guide information.

The invention claimed is:

1. An electronic device comprising:
an input device;
a display; and
a processor, wherein the processor is configured to:
   obtain, via the input device, a first voice command of a user,
   based on output of an electronic document corresponding to the first voice command, identify multiple input fields in the electronic document,
   determine a portion of texts representing an attribute of each of the multiple input fields as guide information,
   display, via the display, the electronic document comprising the guide information and the multiple input fields, wherein the multiple input fields are activated to allow data to be entered and are displayed in a designated order,
   obtain, via the input device, a second voice command of the user,
   determine whether a portion of the second voice command matches the guide information,
   in response to matching the portion of the second voice command and the guide information, display, via the display, information in the second voice command on at least one input field corresponding to the matched guide information,
   obtain, via the input device, a third voice command of the user,
   if the third voice command contains a continue command and data, display the data in one of the multiple input fields based on an order modified from the designated order by the continue command, and
   if the third voice command contains a silence period exceeding a designated time and data, skip one of the multiple input fields and display the data in a next input field of the multiple input fields.

2. The electronic device of claim 1, wherein the processor is configured to:
   display data in the at least one input field based on at least part of the first voice command using the display, and
   if there is a blank input field in the at least one input field, display designated data in the blank input field based on a use history using the display.

3. The electronic device of claim 1, wherein the guide information of the multiple input fields comprises texts or identification information related to the multiple input fields.

4. The electronic device of claim 3, wherein the processor is configured to:
   extract part of the texts related to the multiple input fields based on a priority, and
   determine the extracted part of the texts as part as the guide information.

5. The electronic device of claim 1, wherein the processor is configured to:
   extract guide information corresponding to any one input field of the multiple input fields based on a priority, and
   if the extracted guide information overlaps with guide information corresponding to an other input field of the multiple input fields, extract other guide information corresponding to the other input field based on a next priority.

6. The electronic device of claim 1, wherein the processor is configured to:
   extract an additional voice command of the user using the input device, if part of the additional voice command matches the guide information, display data in an input field corresponding to the matched guide information using the display, and if the part of the additional voice command does not match the guide information, display a guide message using the display.

7. The electronic device of claim 1, wherein the processor is configured to apply a graphic effect to the guide information such that the guide information is highlighted relative to at least one object in the electronic document.

8. The electronic device of claim 1, wherein the processor is configured to:
   detect an additional voice command of the user using the input device, and
   if detecting a modify command in the additional voice command, change data displayed in the at least one input field based on the modify command.

9. The electronic device of claim 1, wherein the processor is configured to:
   detect an additional voice command of the user using the input device,
   display data contained in the additional voice command in the at least one input field corresponding to the additional voice command using the display,
   if there is no blank input field in the at least one input field, output additional guide information,
   detect a voice command corresponding to the additional guide information, and
   execute a function corresponding to the voice command corresponding to the additional guide information.

10. An operating method of an electronic device, comprising:
    obtaining, via an input device of the electronic device, a first voice command of a user;
    based on output of an electronic document corresponding to the first voice command, identifying multiple input fields in the electronic document;
    determining a portion of texts representing an attribute of each of the multiple input fields as guide information;
    displaying, via a display of the electronic device, the electronic document comprising the guide information and the multiple input fields, wherein the multiple input fields are activated to allow data to be entered and are displayed in a designated order;
    obtaining, via the input device, a second voice command of the user;
    determining whether a portion of the second voice command matches the guide information;
    in response to matching the portion of the second voice command and the guide information, displaying, via the display, information in the second voice command on at least one input field corresponding to the matched guide information;
    obtaining, via the input device, a third voice command of the user;
    in response to the third voice command containing a continue command and data, displaying the data in one of the multiple input fields based on an order modified from the designated order by the continue command; and
    in response to the third voice command containing a silence period exceeding a designated time and data, skipping one of the multiple input fields and displaying the data in a next input field of the multiple input fields.

11. The method of claim 10, wherein displaying the electronic document comprises:
    displaying data in the at least one input field based on at least part of the first voice command; and
    if there is a blank input field in the at least one input field, displaying designated data in the blank input field based on a use history.

12. The method of claim 10, wherein the guide information of the multiple input fields comprises texts or identification information related to the multiple input fields.

13. The method of claim 12, wherein determining guide information comprises:
    extracting part of the texts related to the multiple input fields based on a priority; and
    determining the extracted part of the texts as the guide information.

14. The method of claim 10, wherein determining guide information comprises:
    extracting guide information corresponding to any one input field of the multiple input fields based on a priority; and
    if the extracted guide information overlaps with guide information corresponding to an other input field of the multiple input fields, extracting other guide information corresponding to the other input field based on a next priority.

* * * * *